(12) United States Patent
Sato et al.

(10) Patent No.: US 12,211,533 B2
(45) Date of Patent: *Jan. 28, 2025

(54) GLASS FOR MAGNETIC RECORDING MEDIUM SUBSTRATE, MAGNETIC RECORDING MEDIUM SUBSTRATE, MAGNETIC RECORDING MEDIUM, GLASS SPACER FOR MAGNETIC RECORDING AND REPRODUCING APPARATUS, AND MAGNETIC RECORDING AND REPRODUCING APPARATUS

(71) Applicant: HOYA CORPORATION, Tokyo (JP)

(72) Inventors: Koichi Sato, Tokyo (JP); Kazuaki Hashimoto, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,378

(22) Filed: May 24, 2023

(65) Prior Publication Data

US 2023/0306996 A1 Sep. 28, 2023

Related U.S. Application Data

(63) Continuation of application No. 17/629,002, filed as application No. PCT/JP2020/028450 on Jul. 22, 2020, now Pat. No. 11,688,424.

(30) Foreign Application Priority Data

Jul. 22, 2019 (JP) .................................. 2019-134578
Nov. 14, 2019 (JP) .................................. 2019-205993

(51) Int. Cl.
G11B 5/73 (2006.01)
C03C 3/087 (2006.01)

(52) U.S. Cl.
CPC .......... G11B 5/73921 (2019.05); C03C 3/087 (2013.01)

(58) Field of Classification Search
None
See application file for complete search history.

(56) References Cited

U.S. PATENT DOCUMENTS

| | | |
|---|---|---|
| 6,332,338 B1 | 12/2001 | Hashimoto et al. |
| 6,599,606 B1 | 7/2003 | Zou |
| 6,627,565 B1 | 9/2003 | Zou et al. |
| 6,713,418 B2 | 3/2004 | Kishimoto et al. |
| 11,081,133 B2 * | 8/2021 | Sato ................. G11B 5/658 |
| 11,688,424 B2 * | 6/2023 | Sato ................. G11B 5/596 428/846.9 |
| 11,884,584 B2 * | 1/2024 | Sato ................. C03C 3/091 |
| 11,999,652 B2 * | 6/2024 | Sato ................. G11B 5/73921 |
| 12,040,003 B2 * | 7/2024 | Sato ................. G11B 5/658 |
| 2002/0193233 A1 | 12/2002 | Kishimoto et al. |
| 2003/0099062 A1 | 5/2003 | Kataoka et al. |
| 2011/0123832 A1 | 5/2011 | Matsumoto et al. |
| 2012/0244388 A1 | 9/2012 | Nakashima et al. |
| 2013/0126334 A1 | 5/2013 | Tawara et al. |
| 2014/0036644 A1 | 2/2014 | Matsumoto et al. |
| 2014/0050912 A1 | 2/2014 | Isono et al. |
| 2016/0225396 A1 * | 8/2016 | Shimojima .......... C03C 21/002 |
| 2018/0222789 A1 | 8/2018 | Maeda et al. |
| 2019/0362754 A1 | 11/2019 | Sato et al. |
| 2021/0387896 A1 | 12/2021 | Sato et al. |
| 2021/0387897 A1 * | 12/2021 | Tokunaga ............... C03C 3/083 |

FOREIGN PATENT DOCUMENTS

| | | |
|---|---|---|
| CN | 102754152 A | 10/2012 |
| CN | 104303231 A | 1/2015 |
| CN | 105517966 A | 4/2016 |
| CN | 107709256 A | 2/2018 |
| CN | 109923083 A | 6/2019 |
| JP | 2002348141 A | 12/2002 |
| JP | 2004043295 A | 2/2004 |
| JP | 2019032918 A | 2/2019 |
| WO | 2017002835 A1 | 1/2017 |
| WO | 2017061501 A1 | 4/2017 |
| WO | 2018088563 A1 | 5/2018 |
| WO | 2018225725 A1 | 12/2018 |

OTHER PUBLICATIONS

International Search Report in PCT/JP2020/028450 dated Oct. 6, 2020.

* cited by examiner

*Primary Examiner* — Kevin M Bernatz
(74) *Attorney, Agent, or Firm* — Global IP Counselors, LLP

(57) ABSTRACT

In an amorphous glass, an $SiO_2$ content is in a range of 56 mol % or more. An MgO content is in a range of 15 mol % or more and 28 mol % or less. An $Li_2O$ content is in a range of 0.2 mol % or more. An $Na_2O$ content is in a range of 5 mol % or less. A total content of $Al_2O_3$, MgO, and CaO ($Al_2O_3$+MgO+CaO) is 36.50 mol % or less. The total content of $SiO_2$, MgO, $Li_2O$, $Al_2O_3$, and CaO ($SiO_2$+MgO+$Li_2O$+$Al_2O_3$+CaO) is 97.5 mol % or more. A mole ratio of the total content of $SiO_2$ and MgO relative to the $Li_2O$ content [($SiO_2$+MgO)/$Li_2O$] is 13 or more. A mole ratio of a CaO content relative to a total content of $Al_2O_3$ and MgO [CaO/($Al_2O_3$+MgO)] is 0.10 or less.

8 Claims, No Drawings

GLASS FOR MAGNETIC RECORDING MEDIUM SUBSTRATE, MAGNETIC RECORDING MEDIUM SUBSTRATE, MAGNETIC RECORDING MEDIUM, GLASS SPACER FOR MAGNETIC RECORDING AND REPRODUCING APPARATUS, AND MAGNETIC RECORDING AND REPRODUCING APPARATUS

CROSS-REFERENCE TO RELATED APPLICATIONS

This application is a continuation application of U.S. application Ser. No. 17/629,002, filed on Jan. 21, 2022, now U.S. Pat. No. 11,688,424, which is a national stage entry of International Patent Application No. PCT/JP2020/028450, filed on Jul. 22, 2020. This application claims priority to Japanese Patent Application No. 2019-205993 filed on Nov. 14, 2019, and Japanese Patent Application No. 2019-134578 filed on Jul. 22, 2019. The entire disclosures of U.S. application Ser. No. 17/629,002, International Application No. PCT/JP2020/028450, and Japanese Patent Application Nos. 2019-205993 and 2019-134578 are hereby incorporated herein by reference.

TECHNICAL FIELD

The present invention relates to a glass for a magnetic recording medium substrate, a magnetic recording medium substrate, a magnetic recording medium, a glass spacer for a magnetic recording and reproducing apparatus, and a magnetic recording and reproducing apparatus.

BACKGROUND ART

Heretofore, a substrate made from an aluminum alloy was used for a substrate for a magnetic recording medium such as a hard disk (magnetic recording medium substrate). However, as for a substrate made of an aluminum alloy, drawbacks have been pointed out such as easy deformation, and the like. Therefore, nowadays magnetic recording medium substrates made of glass are widely used (for example, see JP 2002-814134A).

SUMMARY

In order to remove foreign matter adhering to the surfaces of magnetic recording medium substrates in manufacturing processes, cleaning is usually performed on the magnetic recording medium substrates using acid, alkali, or the like. However, even though the surfaces of the substrates are finished to be smooth in the manufacturing processes, if glass constituting the substrates does not have sufficient chemical resistance, the surfaces thereof are roughened through cleaning. Therefore, it is desired that glass for a magnetic recording medium substrate has high chemical resistance.

Furthermore, it is also desired that glass for a magnetic recording medium substrate has high impact resistance. This is because of the following reasons.

A magnetic recording medium is usually installed inside a hard disk drive (HDD) incorporated in a device such as a personal computer. In an HDD, a plurality of magnetic recording media (magnetic disks) are attached to a rotation shaft of a spindle motor, and data is written on or read from a magnetic recording layer of the magnetic recording medium that is rotated at a high speed inside the HDD by an actuator incorporated in the HDD. When the magnetic recording medium is rotated at a high speed in order to write or read data and a large impact (e.g., impact caused by falling or the like) is applied to the HDD, there is a risk that the magnetic recording medium may temporarily deform inside the HDD due to the impact and collide with a component called a ramp in a high-speed rotation state, and the magnetic recording medium may be damaged by this collision. In order to prevent such damage, it is desirable that even if the HDD receives impact, the HDD is unlikely to deform, that is, the HDD has high impact resistance. With regard to an HDD, the storage capacity can be increased by reducing the thickness of one magnetic recording medium such that a larger number of magnetic recording media can be mounted on the HDD. However, in general, if the thickness of the glass is reduced, the glass is likely to deform and the above-described damage is likely to occur. Therefore, it is desirable that glass for a magnetic recording medium substrate has high impact resistance in order to achieve both an increase in the storage capacity of an HDD and suppression of the above-described damage.

With respect to the above-described points, PTL 1 (JP 2002-814134A) describes that glass described in PTL 1 can be cleaned without deterioration of the glass surface by cleaning the glass surface using an acidic liquid (paragraph etc. in PTL 1). However, according to studies conducted by the inventors of the present invention, the impact resistance of the glass described in PTL 1 is not sufficient, from the viewpoint of preventing the aforementioned damage. On the other hand, although crystallized glass is known as a material with high impact resistance, the process for manufacturing crystallized glass is complicated. Furthermore, it is not easy for crystallized glass to achieve high smoothness required for a magnetic recording medium substrate.

An aspect of the present invention aims to provide a glass for a magnetic recording medium substrate having high chemical resistance and high impact resistance.

An aspect of the present invention relates to a glass for a magnetic recording medium substrate or for a glass spacer for a magnetic recording and reproducing apparatus, which is an amorphous glass. An $SiO_2$ content is in a range of 56 mol % or more. An MgO content is in a range of 15 mol % or more and 28 mol % or less. An $Li_2O$ content is in a range of 0.2 mol % or more. An $Na_2O$ content is in a range of 5 mol % or less. A total content of $Al_2O_3$, MgO, and CaO ($Al_2O_3$+MgO+CaO) is 36.50 mol % or less. The total content of $SiO_2$, MgO, $Li_2O$, $Al_2O_3$, and CaO ($SiO_2$+MgO+$Li_2O$+$Al_2O_3$+CaO) is 97.5 mol % or more. A mole ratio of the total content of $SiO_2$ and MgO relative to the $Li_2O$ content [($SiO_2$+MgO)/$Li_2O$] is 13 or more. A mole ratio of a CaO content relative to a total content of $Al_2O_3$ and MgO [CaO/($Al_2O_3$+MgO)] is 0.10 or less.

The above-described glass for a magnetic recording medium substrate can have the above-described glass composition, and have high chemical resistance and high impact resistance.

According to an embodiment of the present invention, it is possible to provide a glass for a magnetic recording medium substrate having high chemical resistance and high impact resistance. Furthermore, according to an aspect, it is also possible to provide a magnetic recording medium substrate comprised of the above-described glass for a magnetic recording medium substrate and a magnetic recording medium that includes this substrate. According to another aspect, it is possible to provide a glass spacer for a magnetic recording apparatus. According to still another aspect, it is possible to provide a magnetic recording and reproducing apparatus.

DESCRIPTION OF EMBODIMENTS

[Glass for Magnetic Recording Medium Substrate]

The above-described glass is an amorphous glass having the aforementioned composition. Unlike crystallized glass, amorphous glass refers to glass that substantially does not contain a crystal phase and exhibits a glass transition phenomenon due to an increase in temperature.

Furthermore, the above-described glass may be an amorphous oxide glass. Oxide glass is glass in which a main network-forming component is an oxide.

Hereinafter, the above-described glass will be described in more detail.

<Glass Composition>

A glass composition is denoted by a glass composition based on oxides in the present invention and in this specification. Here, a "glass composition based on oxides" means a glass composition obtained by performing conversion such that all raw glass materials are decomposed in melting and are present as oxides in the glass. The glass composition is denoted on the basis of mole (mol %, mole ratio), unless otherwise specified.

The glass composition in the present invention and this specification can be obtained by, for example, a method such as ICP-AES (Inductively Coupled Plasma-Atomic Emission Spectrometry). ICP-AES is used for quantitative analysis, and the analysis is performed for each of elements. Then, analysis values are converted into expressions based on oxides. Analysis values by means of ICP-AES may include, for example, a measurement error of approximately ±5% of an analysis value. Thus, a value based on oxide expression converted from an analysis value may also include an error of approximately ±5%.

Moreover, in the present invention and this specification, the fact that a constituent component is 0% in content, or is not contained or not introduced denotes that the constituent component is substantially not contained, and that the content of the constituent component is at approximately less than or equal to a level of impurities. "Approximately less than or equal to a level of impurities" means, for example, less than 0.01%.

In the glass composition of the above-described glass, the $SiO_2$ content is in a range of 54 mol % or more and 62 mol % or less, the MgO content is in a range of 15 mol % or more and 28 mol % or less, the $Li_2O$ content is in a range of 0.2 mol % or more, and the $Na_2O$ content is in a range of 5 mol % or less.

Hereinafter, the glass composition of the above-described glass will be described in more detail.

$SiO_2$ is a network-forming component in glass, and serves to improve glass stability. Furthermore, $SiO_2$ is a component that also contributes to improving chemical resistance. From the viewpoint of improving chemical resistance and improving impact resistance, the $SiO_2$ content is 54% or more. Furthermore, in a process for manufacturing a magnetic recording medium substrate, usually, the surface of the substrate is polished. From the viewpoint of improving the smoothness of the surface of the polished magnetic recording medium substrate as well, the $SiO_2$ content is preferably 54% or more. From the above-described viewpoints, the $SiO_2$ content is preferably 55% or more, more preferably 56% or more, even more preferably 57% or more, further preferably 57.5% or more, still more preferably 58% or more, yet more preferably 58.5% or more, further more preferably 59% or more, and still more preferably 60% or more. Also, from the viewpoint of meltability of glass, the $SiO_2$ content is preferably 62% or less, and more preferably 61% or less.

MgO serves to enhance the Young's modulus of glass, to increase the thermal expansion coefficient, and to improve meltability and/or moldability of glass. From the viewpoint of improving impact resistance, the MgO content is 15% or more. The MgO content is preferably 15% or more, also from the viewpoint of improving the Young's modulus and improving the specific elastic modulus. From the above-described viewpoints, the MgO content is preferably 16% or more, and more preferably 17% or more. Furthermore, from the viewpoint of improving devitrification resistance, the content of MgO in the above-described glass is 28% or less, preferably 27% or less, more preferably 26% or less, even more preferably 25% or less, further preferably 24.5% or less, still more preferably 24% or less, yet more preferably 23.5% or less, further more preferably 23% or less, still more preferably 22.5% or less, yet more preferably 22% or less, still more preferably 20% or less, and particularly preferably 19% or less.

Among alkali metal oxides, $Li_2O$ is a component that strongly serves to improve meltability of glass. Also, in a case where the above-described glass is to be used as glass for chemical strengthening, $Li_2O$ is also a component that is responsible for ion exchange in chemical strengthening. From the viewpoint of improving the meltability of glass, the $Li_2O$ content is 0.2% or more, preferably 0.5% or more, more preferably 1% or more, even more preferably 2% or more, further preferably 2.5% or more, still more preferably 3% or more, yet more preferably 3.5% or more, and further more preferably 4% or more. Furthermore, from the viewpoint of further improving chemical resistance and impact resistance, and improving the smoothness of the surface of the polished magnetic recording medium substrate, the $Li_2O$ content is preferably 6% or less, and more preferably 5% or less.

The mole ratio of the total content of $SiO_2$ and MgO relative to the $Li_2O$ content [$(SiO_2+MgO)/Li_2O$] is, from the viewpoint of further improving impact resistance, preferably 13 or more, more preferably more than 13, further preferably 14 or more, and still more preferably 15 or more. Furthermore, the above-described mole ratio [$(SiO_2+MgO)/Li_2O$] is, from the viewpoint of devitrification resistance and solubility, preferably 100 or less, more preferably 50 or less, further preferably 30 or less, still more preferably 25 or less, and yet more preferably 20 or less.

$Na_2O$ is a component that serves to improve the meltability of glass, increase the thermal expansion coefficient, and reduce the viscosity of glass during clarification to thereby facilitate bubble separation. Also, in a case where the above-described glass is to be used as glass for chemical strengthening, $Na_2O$ is also a component that is responsible for ion exchange in chemical strengthening. From the viewpoint of improving impact resistance, the $Na_2O$ content is in a range of 5% or less. The $Na_2O$ content is preferably 5% or less, also from the viewpoint of improving the Young's modulus and improving the specific elastic modulus. From the above-described viewpoints, the $Na_2O$ content is preferably 4% or less, more preferably 3% or less, further preferably 2% or less, and still more preferably 1% or less. In an aspect, the $Na_2O$ content may be 0%, 0% or more or more than 0%, or 0.5% or more.

$B_2O_3$ is a network-forming component in glass, is a component for reducing the specific gravity of glass, and is also a component for improving meltability. From the viewpoint of further improving impact resistance, improving the specific elastic modulus, and improving the Young's modulus, the $B_2O_3$ content is preferably 3% or less, more preferably 2% or less, and further preferably 1% or less. In an aspect, the $B_2O_3$ content may be 0%, 0% or more or more than 0%, or 0.5% or more.

$Al_2O_3$ is a network-forming component in glass, and serves to improve heat resistance. From the viewpoint of improving meltability of glass, the $Al_2O_3$ content is preferably 19% or less, more preferably 18% or less, further preferably 17% or less, still more preferably 16% or less, and yet more preferably 15% or less. Furthermore, from the viewpoint of further improving impact resistance, improving the Young's modulus, and improving the specific elastic modulus, $Al_2O_3$ is preferably 9% or more, more preferably 10% or more, further preferably 11% or more, and still more preferably 12% or more.

BaO also serves to improve meltability and moldability of glass and glass stability, and serves to increase the thermal expansion coefficient. From the viewpoint of reducing the specific gravity, improving the Young's modulus, improving the specific elastic modulus, and further improving impact resistance of glass, the BaO content is preferably 3% or less, more preferably 2% or less, and further preferably 1% or less. In an aspect, the BaO content may be 0%, 0% or more or more than 0%, or 0.5% or more.

CaO also serves to enhance the Young's modulus and the specific elastic modulus of glass, to increase the thermal expansion coefficient, and to improve the meltability and/or moldability of glass. In an aspect, the CaO content may be 0%, 0% or more, or more than 0%. Furthermore, in an aspect, from the viewpoint of favorably obtaining these functions, the CaO content is preferably 0.5% or more, more preferably 1% or more, and even more preferably 1.5% or more. Also, from the viewpoint of further improving chemical resistance, the CaO content is preferably 10% or less, more preferably 9% or less, further preferably 8% or less, still more preferably 7% or less, yet more preferably 6% or less, further more preferably 5% or less, still more preferably 4% or less, and yet more preferably 3% or less.

From the viewpoint of further improving impact resistance, a mole ratio of the MgO content relative to the CaO content (MgO/CaO) is preferably 6 or more, more preferably 7 or more, and even more preferably 8 or more. Furthermore, the above-described mole ratio (MgO/CaO) is, from the viewpoint of devitrification resistance, preferably 30 or less, more preferably 25 or less, further preferably 20 or less, still more preferably 18 or less, and yet more preferably 15 or less.

From the viewpoint of improving devitrification resistance and further improving chemical resistance, a mole ratio of the total content of $Al_2O_3$ and CaO relative to the MgO content [($Al_2O_3$+CaO)/MgO] is preferably 0.55 or more, and more preferably 0.57 or more. Furthermore, the larger the lower limit of the mole ratio is, the more preferable the mole ratio is, in the following order: 0.58 or more, 0.59 or more, 0.60 or more, 0.61 or more, 0.62 or more, 0.625 or more, 0.63 or more, 0.65 or more, 0.70 or more, 0.75 or more, and 0.80 or more. Also, the above-described mole ratio [($Al_2O_3$+CaO)/MgO] is, from the viewpoint of impact resistance, preferably 1.8 or less, more preferably 1.5 or less, further preferably 1.3 or less, and still more preferably 1.2 or less, and yet more preferably 1.1 or less.

A mole ratio of the CaO content relative to the $Al_2O_3$ content (CaO/$Al_2O_3$) is, from the viewpoint of increasing a glass transition temperature, preferably 0.60 or less, more preferably 0.50 or less, further preferably 0.40 or less, still more preferably 0.30 or less, yet more preferably 0.24 or less, and further more preferably 0.20 or less. Furthermore, the above-described mole ratio (CaO/$Al_2O_3$) may be 0 or more, more than 0, or 0.10 or more, for example.

From the viewpoint of improving the Young's modulus, improving the specific elastic modulus, and further improving impact resistance, the mole ratio of the CaO content relative to the total content of $Al_2O_3$ and MgO [CaO/($Al_2O_3$+MgO)] is preferably 0.30 or less, more preferably 0.20 or less, and further preferably 0.10 or less. Furthermore, the above-described mole ratio may be 0 or more, more than 0, 0.01 or more, or 0.03 or more, for example.

From the viewpoint of further improving impact resistance, a mole ratio of the MgO content relative to the $Li_2O$ content (MgO/$Li_2O$) is preferably 2.3 or more, more preferably 2.5 or more, further preferably 2.7 or more, and still more preferably 3.0 or more. From the viewpoint of improving the meltability of glass, the mole ratio (MgO/$Li_2O$) is preferably 28 or less, more preferably 26 or less, even more preferably 24 or less, and further preferably 22 or less.

From the viewpoint of improving the Young's modulus, improving the specific elastic modulus, and further improving impact resistance, the total content of $Al_2O_3$, MgO, and CaO ($Al_2O_3$+MgO+CaO) is preferably 29% or more, more preferably 30% or more, even more preferably 31% or more, further preferably 32% or more, and still more preferably 33% or more. Furthermore, the above-described total content ($Al_2O_3$+MgO+CaO) may be 50% or less, 48% or less, 46% or less, 44% or less, 43% or less, 42% or less, or 41% or less.

From the viewpoint of improving solubility and improving devitrification resistance, the total content of $SiO_2$, MgO, $Li_2O$, $Al_2O_3$, and CaO ($SiO_2$+MgO+$Li_2O$+$Al_2O_3$+CaO) is preferably 93 mol % or more. From the viewpoint of improving the smoothness of the surface of the polished magnetic recording medium substrate and from the viewpoint of improving vibration and impact resistance of a magnetic recording medium provided with the magnetic recording medium substrate, the above-described total content is preferably 93% or more. From the above-described viewpoints, the total content ($SiO_2$+MgO+$Li_2O$+$Al_2O_3$+CaO) is more preferably 94% or more, even more preferably 95% or more, further preferably 96% or more, still more preferably 97% or more, and yet more preferably 98% or more. Furthermore, the above-described ($SiO_2$+MgO+$Li_2O$+$Al_2O_3$+CaO) may be 100% or less, and may also be 99% or less.

SrO serves to improve meltability and moldability of glass and glass stability, and serves to increase the thermal expansion coefficient. From the viewpoint of reducing the specific gravity and reducing raw material cost, the SrO content is preferably 4% or less, preferably 3% or less, even more preferably 2% or less, and further preferably 1% or less. In an aspect, the SrO content may be 0%, 0% or more or more than 0%, or 0.5% or more.

$K_2O$ is a component that serves to improve the meltability and moldability of glass and increase the thermal expansion coefficient. From the viewpoint of reducing the specific gravity, improving the Young's modulus, and improving the specific elastic modulus, and further improving impact resistance, the $K_2O$ content is preferably 2% or less, more preferably 1% or less, and further preferably 0.5% or less. In an aspect, the $K_2O$ content may be 0%, 0% or more, or more than 0%.

$TiO_2$ is a component that improves glass stability. From the viewpoint of reducing the specific gravity and improving devitrification resistance, the $TiO_2$ content is preferably 4% or less, more preferably 3% or less, further preferably 2% or less, and still more preferably 1% or less. In an aspect, the $TiO_2$ content may be 0%, 0% or more or more than 0%, or 0.5% or more.

ZnO serves to improve meltability. From the viewpoint of reducing the specific gravity, improving the Young's modulus, improving the specific elastic modulus, and further improving impact resistance, the ZnO content is preferably 2% or less, and more preferably 1% or less. In an aspect, the ZnO content may be 0%, 0% or more or more than 0%, or 0.5% or more.

From the viewpoint of reducing the specific gravity and improving devitrification resistance, the $ZrO_2$ content is preferably 5% or less, more preferably 4% or less, even more preferably 3% or less, further preferably less than 3%, still more preferably 2% or less, and yet more preferably 1% or less. In an aspect, the $ZrO_2$ content may be 0%, 0% or more or more than 0%, or 0.5% or more.

From the viewpoint of reducing the specific gravity and improving devitrification resistance, the $Y_2O_3$ content is preferably 2% or less, more preferably 1.5% or less, and even more preferably 1% or less. In an aspect, the $Y_2O_3$ content may be 0%, 0% or more or more than 0%, or 0.5% or more.

The $Fe_2O_3$ content of the above-described glass expressed as an outer percentage may be 1 mol % or less, 0.7 mol % or less, 0.5 mol % or less, 0.4 mol % or less, 0.3 mol % or less, 0.1 mol % or less, 0.07 mol % or less, 0.05 mol % or less, 0.04 mol % or less, 0.03 mol % or less, or 0.02 mol % or less. In an aspect, the above-described glass may not contain Fe (the $Fe_2O_3$ content expressed as an outer percentage may be 0 mol %). The $Fe_2O_3$ content expressed as an outer percentage refers to a value represented by a mole percentage of the amount of $Fe_2O_3$ contained in the glass where the total content of the glass components other than $Fe_2O_3$ is 100 mol %.

The above-described glass may also contain at least one type selected from the group consisting of Cu, Co, Mn, Nd, Pr, Nb, V, Cr, Ni, Mo, Ho, and Er.

F is a component that easily volatilizes when glass melts and also causes striae, and thus it is preferable that the above-described glass does not contain F. It is preferable that the glass does not contain F from the viewpoint of suppressing erosion of a melting furnace, suppressing a decrease in the Young's modulus, and suppressing a decrease in the specific elastic modulus as well.

Pb, Cd, and As are substances that adversely affect the environment, and thus the introduction of these substances is preferably avoided.

From the viewpoint of obtaining a clarifying effect, the above-described glass may contain at least one selected from the group consisting of $SnO_2$, $CeO_2$, and $Sb_2O_3$. In an aspect, the total content of $SnO_2$ and $CeO_2$ may be 0%. In another aspect, the above-described glass may contain $SnO_2$ and/or $CeO_2$, and the total content of $SnO_2$ and $CeO_2$ ($SnO_2+CeO_2$) ranges preferably from 0.05% to 2%. As a consequence of the fact that the total content of $SnO_2$ and $CeO_2$ is 0.05% or more, a sufficient clarifying effect can be obtained, and residual bubbles can be reduced. Also, as a consequence of the fact that the total content ($SnO_2$ and $CeO_2$) is 2% or less, during melting of glass, lowering of productivity by the blow-up of molten glass can be prevented. The lower limit of the total content ($SnO_2+CeO_2$) is preferably 0.10% or more, more preferably 0.20% or more, even more preferably 0.25% or more, further preferably 0.30% or more, still more preferably 0.35% or more, and yet more preferably 0.40% or more. Also, the upper limit of the total content ($SnO_2+CeO_2$) is preferably 1.5% or less, more preferably 1.2% or less, even more preferably 1.0% or less, further preferably 0.70% or less, still more preferably 0.65% or less, yet more preferably 0.60% or less, further more preferably 0.55% or less, and still further preferably 0.50% or less.

$SnO_2$ serves to promote clarification in a state where the melting temperature of glass is comparatively high (a temperature range of approximately 1400° C. to 1600° C.). In a circumstance where use of a clarifying agent such as $Sb_2O_3$ and arsenious acid adversely affecting the environment is limited, in an aspect, the introduction of $SnO_2$ into the above-described glass is preferable for removing bubbles in glass having a high melting temperature. From the viewpoint of obtaining a clarifying effect, the content of $SnO_2$ is preferably 0.01% or more, more preferably 0.05% or more, even more preferably 0.10% or more, further preferably 0.15% or more, and still more preferably 0.20% or more. Also, the content of $SnO_2$ is preferably 2% or less, more preferably 1.5% or less, even more preferably 1.0% or less, further preferably 0.8% or less, and still more preferably 0.5% or less.

$CeO_2$ is a component that exhibits a glass clarification action as is the case for $SnO_2$. $CeO_2$ serves to take in oxygen and fix it as a glass component in a state where the melting temperature of glass is comparatively low (a temperature range approximately from 1200° C. to 1400° C.), and, in an aspect, it is preferable to introduce $CeO_2$ into the above-described glass as a clarifying agent. From the viewpoint of obtaining a clarifying effect, the content of $CeO_2$ is preferably 0.01% or more, more preferably 0.05% or more, even more preferably 0.08% or more, and further preferably 0.10% or more. Also, the content of $CeO_2$ is preferably 2% or less, more preferably 1.5% or less, even more preferably 1.0% or less, further preferably 0.8% or less, still more preferably 0.5% or less, and yet more preferably 0.3% or less. As a consequence of allowing $SnO_2$ and $CeO_2$ to coexist, a clarification action in a wide temperature range can be obtained, and thus, in an aspect, the above-described glass preferably contain both $SnO_2$ and $CeO_2$.

From the viewpoint of reducing environmental burdens, it is desirable to refrain from using $Sb_2O_3$. The content of $Sb_2O_3$ in the above-described glass ranges preferably from 0% to 0.5%. The content of $Sb_2O_3$ is more preferably 0.3% or less, even more preferably 0.1% or less, further preferably 0.05% or less, and still more preferably 0.02% or less, and particularly preferably $Sb_2O_3$ is not contained.

The above-described glass can be produced by weighing and blending raw glass materials such as oxides, carbonates, nitrates, sulfates, and hydroxides so as to give a predetermined glass composition, by sufficiently mixing these materials, heating and melting the mixture within a range of, for example, 1400° C. to 1600° C. in a melting vessel, and by molding homogenized molten glass that has been subjected to clarification and stirring to cause sufficient bubble separation. It is preferable to heat and melt raw glass materials in a melting tank at 1400° C. to 1550° C., to raise the temperature of the obtained molten glass in a clarification tank and keep the glass at 1450° C. to 1600° C., and after that to lower the temperature and cause glass to flow out at 1200° C. to 1400° C. to be molded, for example.

<Glass Properties>

As a consequence of performing the above-described composition adjustment, the above-described glass can have various glass properties described below.

(Chemical Resistance)

An example of an indicator for chemical resistance of glass is an etching rate, which refers to the etching amount per unit time (units: nm/min) when glass is immersed in a 0.5-mass % aqueous solution of potassium hydroxide whose temperature is kept at 50° C. The etching rate of the above-described glass may be 0.5 nm/min or less. With regard to a method for measuring an etching rate, the later-descried examples can be referred to. The above-described etching rate is preferably in a range of 0 nm/min or more and 0.5 nm/min or less.

(Young's Modulus)

The Young's modulus of the above-described glass is preferably 90 GPa or more. According to a glass for a magnetic recording medium substrate having high rigidity represented by a Young's modulus of 90 GPa or more, it is possible to inhibit the deformation of a substrate while a spindle motor is rotating, and thus it is also possible to inhibit warpage and deflection of a magnetic recording medium accompanying deformation of the substrate. The Young's modulus of the above-described glass is preferably 91 GPa or more, more preferably 92 GPa or more, even more preferably 93 GPa or more, further preferably 94 GPa or more, and still more preferably 95 GPa or more. The upper limit of the Young's modulus is, for example, approximately 120 GPa. However, a higher Young's modulus means higher rigidity, which is more preferable, and thus the upper limit is not particularly limited.

(Specific Gravity)

The specific gravity of the above-described glass is preferably 2.75 or less. The specific gravity of the above-described glass is more preferably 2.73 or less, even more preferably 2.70 or less, further preferably 2.68 or less, still more preferably 2.64 or less, yet more preferably 2.62 or less, and further more preferably 2.60 or less. As a consequence of a reduction in the specific gravity of a glass for a magnetic recording medium substrate, the weight of a magnetic recording medium substrate and furthermore the weight of a magnetic recording medium can be reduced, and consequently suppression of power consumption of a magnetic recording and reproducing apparatus (usually referred to as an "HDD") becomes possible. The lower limit of the specific gravity is, for example, approximately 2.40. However, a lower specific gravity is more preferable. Therefore, the lower limit is not particularly limited.

(Specific Elastic Modulus)

A specific elastic modulus is obtained by dividing the Young's modulus of glass by the density thereof. Here, density can be considered as a value obtained by giving the unit $g/cm^3$ to the specific gravity of glass. From the viewpoint of providing a substrate that is less likely to be deformed, the specific elastic modulus of the above-described glass is preferably 30 MNm/kg or more, more preferably 32 MNm/kg or more, even more preferably 33 MNm/kg or more, further preferably 34 MNm/kg or more, and still more preferably 35 MNm/kg or more. The upper limit of the specific elastic modulus is, for example, approximately 40 MNm/kg. However, a higher specific elastic modulus is more preferable. Therefore, the upper limit is not particularly limited.

(Thermal Expansion Coefficient)

An HDD with a built-in magnetic recording medium usually has a structure in which the center portion is pressed down with a spindle of a spindle motor and a clamp and the magnetic recording medium itself is rotated. Thus, when there is a large difference between respective thermal expansion coefficients of a magnetic recording medium substrate and a spindle material constituting the spindle portion, deviation occurs during use between thermal expansion/thermal contraction of the spindle and thermal expansion/thermal contraction of the magnetic recording medium substrate relative to ambient temperature change. As a result, a phenomenon such as deformation of the magnetic recording medium occurs. When such a phenomenon occurs, a head cannot read written information, causing deterioration of the reliability of recording/reproduction. Accordingly, a glass for a magnetic recording medium substrate is required to have a suitable thermal expansion coefficient at approximately the same level as that of a spindle material (e.g., stainless steel, for example). Generally, a spindle material for HDDs has an average linear expansion coefficient (thermal expansion coefficient) of $70 \times 10^{-7}/°$ C. or more within a temperature range of 100° C. to 300° C., and in a case where the average linear expansion coefficient of a glass for a magnetic recording medium substrate at 100° C. to 300° C. is $40 \times 10^{-7}/°$ C. or more, the difference between the thermal expansion coefficient of the glass and that of a spindle material is small, and thus the glass for a magnetic recording medium substrate can contribute to improving the reliability of the magnetic recording medium. The average linear expansion coefficient (hereinafter, also referred to as "a") of the above-described glass at 100° C. to 300° C. is preferably $40 \times 10^{-7}/°$ C. or more, more preferably $41 \times 10^{-7}/°$ C. or more, even more preferably $42 \times 10^{-7}/°$ C. or more, further preferably $43 \times 10^{-7}/°$ C. or more, still more preferably $44 \times 10^{-7}/°$ C. or more, and yet more preferably $45 \times 10^{-7}/°$ C. or more. Also, the average linear expansion coefficient ($\alpha$) of the above-described glass at 100° C. to 300° C. is preferably $70 \times 10^{-7}/°$ C. or less, more preferably $68 \times 10^{-7}/°$ C. or less, even more preferably $65 \times 10^{-7}/°$ C. or less, further preferably $63 \times 10^{-7}/°$ C. or less, still more preferably $60 \times 10^{-7}/°$ C. or less, yet more preferably $57 \times 10^{-7}/°$ C. or less, further more preferably $55 \times 10^{-7}/°$ C. or less, still more preferably $53 \times 10^{-7}/°$C or less, and yet more preferably $50 \times 10^{-7}/°$ C. or less.

(Glass Transition Temperature)

Usually, magnetic recording medium substrates are subjected to a high temperature treatment in a process for forming a magnetic recording layer on a substrate. In order to form a magnetic recording layer containing a magnetic material with high magnetic anisotropy energy, which has been developed recently for high-density recording with a magnetic recording medium, for example, usually, film formation is performed at high temperatures or heat treatment is performed at high temperatures after film formation. It is preferable that a magnetic recording medium substrate has heat resistance capable of withstanding such a high temperature treatment, because the flatness of the substrate exposed to high temperatures in a high temperature treatment can be maintained. The glass transition temperature (hereinafter, also referred to as "Tg"), which is an indicator related to heat resistance, of the above-described glass is preferably 640° C. or higher, more preferably 650° C. or higher, even more preferably 660° C. or higher, further preferably 670° C. or higher, still more preferably 675° C. or higher, yet more preferably 680° C. or higher, further more preferably 685° C. or higher, and still more preferably 687° C. or higher. Also, the upper limit of the glass transition temperature is, for example, approximately 770° C. or 750° C. However, a higher glass transition temperature is more preferable from the viewpoint of heat resistance, and thus the upper limit is not particularly limited. Note that the above-described glass is not limited to a glass for a substrate of a magnetic recording medium having a magnetic recording layer containing a magnetic material that requires a high temperature treatment, and can be used to produce a magnetic recording medium provided with various magnetic materials.

(Glass Stability)

Preferably, the above-described glass can exhibit high glass stability. Methods for evaluating glass stability may include a 1350° C. and 16 hour holding test, a 1300° C. and 16 hour holding test, or a 1250° C. and 16 hour holding test, which will be described later in detail. Preferably, an evaluation result of A or B is given in at least one of the 1350° C. and 16 hour holding test, the 1300° C. and 16 hour holding test, and the 1250° C. and 16 hour holding test, and more preferably an evaluation result of A is given in at least one of them. It can be said that glasses that achieve better results in holding tests at lower holding temperatures have higher glass stability.

[Magnetic Recording Medium Substrate]

A magnetic recording medium substrate according to an aspect of the present invention is comprised of the above-described glass.

Magnetic recording medium substrates can be manufactured through processes for heating raw glass materials to thereby prepare molten glass, for molding the molten glass into a plate shape by any one of a press molding method, a down-draw method, and a float method, and for processing the obtained plate-shaped glass. In a press molding method, molten glass flowing out from a glass outflow pipe is cut to a predetermined volume to give an intended molten glass lump, which is press-molded with a press molding die to thereby produce a thin-walled disk-shaped substrate blank, for example. Subsequently, the obtained substrate blank is given a center hole, and subjected to outer/inner circumference processing, lapping, and polishing for both main surfaces. Subsequently, a disk-shaped substrate can be obtained through cleaning processes including acid cleaning and alkali cleaning.

In the above magnetic recording medium substrate, in an aspect, the surface composition and internal composition thereof are homogeneous. Here, "the surface composition and internal composition thereof are homogeneous" means that no ion exchange has been performed (that is, an ion-exchange layer is not contained). A magnetic recording medium substrate that does not have an ion-exchange layer is manufactured without performing ion exchange treatment, and thus it is possible to significantly reduce manufacturing costs.

Also, in an aspect, the above-described magnetic recording medium substrate has an ion-exchange layer on a part of or on the entirety of the surface. An ion-exchange layer exhibits compression stress, and thus the presence or absence of an ion-exchange layer can be confirmed by fracturing the substrate perpendicularly to a main surface and obtaining a stress profile by the Babinet method in the fracture surface. A "main surface" is a surface of a substrate on which a magnetic recording layer is to be provided or has been provided. This surface is a surface having the largest area among surfaces of a magnetic recording medium substrate, and thus is referred to as a main surface. In a case of a disk-shaped magnetic recording medium, the main surface corresponds to a circular surface (if there is a center hole, the center hole is excluded) of the disk. The presence or absence of an ion-exchange layer can be confirmed also by a method or the like for measuring concentration distribution of alkali metal ions in the depth direction from the substrate surface.

An ion-exchange layer can be formed by bring an alkali salt into contact with a substrate surface under high temperatures and exchanging an alkali metal ion in the alkali salt for an alkali metal ion in the substrate. Known techniques can be applied to ion exchange (also referred to as a "strengthening treatment" or "chemical strengthening"), and as an example, paragraphs 0068 to 0069 in WO 2011/019010A1 can be referred to.

The thickness of the above-described magnetic recording medium substrate is 1.5 mm or less, for example, preferably 1.2 mm or less, more preferably 1.0 mm or less, even more preferably 0.8 mm or less, further preferably less than 0.8 mm, still more preferably 0.7 mm or less, and yet more preferably 0.6 mm or less. Furthermore, the thickness of the above-described magnetic recording medium substrate is 0.3 mm or more, for example. From the viewpoint of improving the storage capacity of an HDD, it is preferable that the thickness of a magnetic recording medium substrate can be reduced. Furthermore, the above-described magnetic recording medium substrate preferably has a disk shape having a center hole.

The above-described magnetic recording medium substrate is comprised of an amorphous glass. Amorphous glass can realize good surface smoothness when it is processed into a substrate, as compared with crystallized glass.

[Magnetic Recording Medium]

An aspect of the present invention relates to a magnetic recording medium having a magnetic recording layer on the above-described magnetic recording medium substrate.

A magnetic recording medium is referred to as a magnetic disk, hard disk, or the like, and is suitable for various magnetic recording and reproducing apparatuses, such as: internal memories (such as fixed disk) for desktop personal computers, computers for servers, notebook computers, and mobile personal computers: internal memories for portable recording and reproducing apparatuses for recording and reproducing images and/or voices; and recording and reproducing devices for in-vehicle audio devices. In the present invention and this specification, a "magnetic recording and reproducing apparatus" means an apparatus capable of performing one of or both of magnetic recording of information and magnetic reproduction of information.

A magnetic recording medium has a configuration in which, for example, at least an adhesive layer, an undercoat layer, a magnetic layer (magnetic recording layer), a protective layer, and a lubricating layer are stacked, in that order from a main surface, on the main surface of a magnetic recording medium substrate.

A magnetic recording medium substrate is introduced into an evacuated film formation apparatus, and sequential film formation from the adhesive layer to the magnetic layer is performed over the main surface of a magnetic recording medium substrate by a DC (Direct Current) magnetron sputtering process in an Ar atmosphere, for example. CrTi can be used for the adhesive layer, for example, and a material containing Ru or MgO can be used for the undercoat layer, for example. Note that a soft magnetic layer or a heat sink layer may also be added as appropriate. After the above-described film formation, for example, by a CVD (Chemical Vapor Deposition) process, the protective layer is formed using $C_2H_4$, which is subjected to a nitriding treatment of introducing nitrogen to the surface in the same chamber to thereby be able to form a magnetic recording medium. Thereafter, for example, applying PFPE (polyfluoropolyether) onto the protective layer by a dip coat method makes it possible to form the lubricating layer.

In order to achieve further higher density recording with a magnetic recording medium, a magnetic recording layer preferably contains a magnetic material with high magnetic anisotropy energy. Magnetic materials preferable from this viewpoint can include Fe—Pt-based magnetic materials and Co—Pt-based magnetic materials. Note that, here, "-based" means inclusion. Namely, the above-described magnetic recording medium preferably has a magnetic recording layer containing Fe and Pt, or Co and Pt, as the magnetic recording layer. With respect to a magnetic recording layer containing these magnetic materials and to a film formation method thereof, descriptions in paragraph 0074 in WO 2011/019010A1, and Examples in this publication can be referred to. Furthermore, a magnetic recording medium having such a magnetic recording layer is preferably applied to a magnetic recording apparatus by a recording system referred to as an energy-assisted recording system. Among energy-assisted recording systems, a recording system in which magnetization reversal is assisted by irradiation with near-field light or the like is referred to as a heat-assisted recording system, and a recording system in which magnetization reversal is assisted by microwaves is referred to as a microwave-assisted recording system. With respect to details of these, paragraph 0075 in WO 2011/019010A1 can be referred to. Note that a conventional CoPtCr-based material may be used as a magnetic material for forming a magnetic recording layer.

Incidentally, in recent years, a significant reduction in a gap between a recording and reproducing element portion of a magnetic head and a surface of a magnetic recording medium (low floating amount) is achieved by mounting a DFH (Dynamic Flying Height) mechanism on a magnetic head, and thereby the achievement of further higher recording density is realized. The DFH mechanism is a function that causes only the vicinity of a recording and reproducing element portion to project in the medium surface direction, by providing a heating portion such as a micro heater near the element portion of a magnetic head. Consequently, the distance (flying height) between the magnetic head and the magnetic recording layer of a medium becomes smaller, and thus it becomes possible to pick out signals from smaller magnetic particles and to achieve further higher recording density. On the other hand, however, the gap (flying height) between the element portion of a magnetic head and the medium surface becomes extremely small. When surface roughness is present on the surface of a magnetic recording medium substrate due to the surface thereof being cleaned, the surface roughness of this substrate is reflected on the surface of the magnetic recording medium, thereby lowering the surface smoothness of the magnetic recording medium. When a magnetic head is moved closer to a magnetic recording medium surface having inferior surface smoothness, the magnetic head may come into contact with the magnetic recording medium surface to damage the magnetic head. Therefore, it is inevitable to secure some degree of flying height in order to prevent the contact. From the above viewpoint, in magnetic recording medium substrates, in order to produce a magnetic recording medium having high surface smoothness, it is desirable that it is possible to suppress surface roughness caused through cleaning, and a magnetic recording medium substrate has high chemical resistance. Because the above-described magnetic recording medium substrate can preferably have high chemical resistance, the above-described magnetic recording medium provided with the substrate like this is also suitable for magnetic recording apparatuses on which a DFH mechanism with extremely narrowed flying height is mounted.

There is no particular limitation regarding the dimensions of both of the above-described magnetic recording medium substrate (e.g., magnetic-disk glass substrate) and magnetic recording medium (e.g., magnetic disk), and, for example, the medium and substrate can also be downsized because higher recording density is possible. They can have a dimension of a nominal diameter of, needless to say, 2.5 inches, a smaller diameter (e.g., 1 inch, 1.8 inches), 3 inches, 3.5 inches, or the like.

Because the above-described magnetic recording medium is comprised of a glass for a magnetic recording medium substrate according to an aspect of the present invention, the above-described glass can have the aforementioned glass physical properties. Furthermore, the above-described magnetic recording medium can preferably exhibit high impact resistance.

[Glass Spacer for Magnetic Recording and Reproducing Apparatus]

An aspect of the present invention relates to a glass spacer for a magnetic recording and reproducing apparatus, the glass spacer including an amorphous glass, wherein an $SiO_2$ content is in a range of 54 mol % or more and 62 mol % or less;

an MgO content is in a range of 15 mol % or more and 28 mol % or less;

an $Li_2O$ content is in a range of 0.2 mol % or more; and an $Na_2O$ content is in a range of 5 mol % or less.

A magnetic recording medium can be used for magnetically recording and/or reproducing information in a magnetic recording and reproducing apparatus. A magnetic recording and reproducing apparatus is usually provided with a spacer for fixing a magnetic recording medium to a spindle of a spindle motor and/or for keeping a distance between a plurality of magnetic recording media. In recent years, the use of a glass spacer as the spacer like this is proposed. For reasons similar to the reasons described in detail regarding a glass for a magnetic recording medium substrate, it is also desirable that this glass spacer has high chemical resistance and impact resistance. To address this, the glass having the above-described composition is suitable as a glass spacer for a magnetic recording and reproducing apparatus since the above-described glass can have high chemical resistance and impact resistance.

A spacer for a magnetic recording and reproducing apparatus is a ring-shaped member, and details of a configuration of the glass spacer, a method for manufacturing the glass spacer, and the like are known. Furthermore, with respect to a method for manufacturing a glass spacer, the above description about a method for manufacturing a glass for a magnetic recording medium substrate and a method for manufacturing a magnetic recording medium substrate can also be referred to. Also, with respect to other details of a glass composition, glass physical properties and the like of the glass spacer for a magnetic recording and reproducing apparatus according to an aspect of the present invention, the above description about the glass for a magnetic recording medium substrate, magnetic recording medium substrate and magnetic recording medium according to respective aspects of the present invention can be referred to.

Note that the glass spacer for a magnetic recording and reproducing apparatus can be comprised of the above-described glass, or may have a configuration in which one or more films such as conductive films are formed on a surface of the above-described glass. In order to eliminate static electricity generated while a magnetic recording medium is rotating, a conductive film such as an NiP alloy film can also be formed on the surface of a glass spacer through plating, or using an immersion method, a vapor deposition method, a sputtering method, or the like. Also, the surface smoothness of a glass spacer can be enhanced through polishing processing (for example, average surface roughness is 1 μm or less), which can increase an adhesion between a magnetic recording medium and a spacer to thereby inhibit the occurrence of positional displacement.

[Magnetic Recording and Reproducing Apparatus]

An aspect of the present invention relates to a magnetic recording and reproducing apparatus, which includes at least one of:

the magnetic recording medium according to an aspect of the present invention; and the glass spacer according to an aspect of the present invention.

A magnetic recording and reproducing apparatus includes at least one magnetic recording medium and at least one spacer, and further includes usually a spindle motor for rotationally driving the magnetic recording medium, and at least one magnetic head for performing recording and/or reproduction of information to the magnetic recording medium.

The above-described magnetic recording and reproducing apparatus according to an aspect of the present invention can include, as at least one magnetic recording medium, the magnetic recording medium according to an aspect of the present invention, and also can include a plurality of the magnetic recording media according to an aspect of the present invention. The above-described magnetic recording and reproducing apparatus according to an aspect of the present invention can include, as at least one spacer, the glass spacer according to an aspect of the present invention, and also can include a plurality of the glass spacers according to an aspect of the present invention. A small difference between the thermal expansion coefficient of a magnetic recording medium and the thermal expansion coefficient of a spacer is preferable from the viewpoint of inhibiting the occurrence of phenomena that may arise due to the difference between thermal expansion coefficients of the two, for example, strain of a magnetic recording medium and lowering of stability during the rotation due to positional displacement of a magnetic recording medium. From this viewpoint, it is preferable that the magnetic recording and reproducing apparatus according to an aspect of the present invention includes: the magnetic recording medium according to an aspect of the present invention, as at least one magnetic recording medium, and as more magnetic recording media in a case where a plurality of magnetic recording media are to be included; and includes: the glass spacer according to an aspect of the present invention, as at least one spacer, and as more spacers in a case where a plurality of spacers are to be included. Furthermore, for example, the magnetic recording and reproducing apparatus according to an aspect of the present invention can be one in which the glass constituting the magnetic recording medium substrate contained in the magnetic recording medium and the glass constituting the glass spacer have the same glass composition.

The magnetic recording and reproducing apparatus according to an aspect of the present invention may be one that contains at least one of the magnetic recording medium according to an aspect of the present invention and the glass spacer according to an aspect of the present invention. Known techniques related to magnetic recording and reproducing apparatuses can be applied to other points. In an aspect, it is possible to use, as a magnetic head, an energy-assisted magnetic recording head having: an energy source (for example, heat source such as a laser light source, microwaves, and the like) for assisting magnetization reversal (assisting writing of magnetic signals): a recording element portion; and a reproducing element portion. The magnetic recording and reproducing apparatus, as described above, using an energy-assisted recording system that includes the energy-assisted magnetic recording head is useful as a magnetic recording and reproducing apparatus having high recording density and high reliability. Furthermore, when manufacturing a magnetic recording medium used for a magnetic recording and reproducing apparatus of an energy-assisted recording system such as a heat-assisted recording system provided with a heat-assisted magnetic recording head having a laser light source or the like, sometimes a magnetic recording layer containing a magnetic material with high magnetic anisotropy energy is formed on a magnetic recording medium substrate. In order to form such a magnetic recording layer, film formation is usually performed at high temperatures or heat treatment is performed at high temperatures after film formation. The magnetic recording medium substrate according to an aspect of the present invention is preferable as a magnetic recording medium substrate that may have high heat resistance capable of withstanding such treatment at high temperatures. However, the magnetic recording and reproducing apparatus according to an aspect of the present invention is not limited to an energy-assisted magnetic recording and reproducing apparatus.

EXAMPLES

Hereinafter, the present invention will be described in more detail with reference to Examples. However, the present invention is not limited to embodiments represented in Examples.

Examples No. 1 to No. 139

Raw materials such as oxides, carbonates, nitrates, and hydroxides were weighed so as to give glasses with respective compositions as shown in Table 1 below (Table 1-1 to Table 1-7), and these materials were then mixed to give respective blended raw materials. Each molten glass obtained by introducing the blended raw material into a melting tank and by heating and melting the same in a range of 1400° C. to 1600° C., was held at 1400° C. to 1550° C. for 6 hours in a clarification tank. Then, the temperature was lowered (temperature decrease) and each molten glass was held in a range of 1200° C. to 1400° C. for 1 hour and was then molded to give each glass (amorphous oxide glass) for evaluation described below.

<Evaluation of Physical Properties of Glass>

(1) Glass Transition Temperature (Tg), Average Linear Expansion Coefficient ($\alpha$)

Glass transition temperature Tg, and average linear expansion coefficient $\alpha$ at 100° C. to 300° C. of each glass were measured using a thermomechanical analysis (TMA) apparatus.

(2) Young's Modulus

The Young's modulus of each glass was measured using an ultrasonic method.

(3) Specific Gravity

The specific gravity of each glass was measured using the Archimedes method.

(4) Specific Elastic Modulus

A specific elastic modulus was calculated from the Young's modulus obtained in (2) and the specific gravity obtained in (3).

(5) Glass Stability 100 g of each glass was placed in a platinum crucible, and the crucible was introduced into a heating furnace whose in-furnace temperature was set to 1250° C., 1300° C., or 1350° C., and was then left for 16 hours while the in-furnace temperature was maintained (holding test). After a lapse of 16 hours, the crucible was taken out from the heating furnace, each glass in the crucible was moved onto a refractory and was cooled to room temperature, the presence or absence of crystals of the glass was observed with an optical microscope (magnifying power of 40 to 100), and evaluation was performed according to the criteria below.

A: There are no crystals on the glass surface, in the glass, or at the interface between the glass surface and the bottom portion of the platinum crucible.

B: There are within ten crystals/100 g with a diameter of several tens of micrometers on the glass surface and at the interface between the glass surface and the bottom portion of the platinum crucible.

C: There are at least ten crystals/100 g with a diameter of several tens of micrometers on the glass surface and at the interface between the glass surface and the bottom portion of the platinum crucible.

D: There are crystals in the glass.

E: There were crystals on the glass surface, in the glass, and at the interface between the glass surface and the bottom portion of the platinum crucible.

F: There are a large number of crystals in the entire glass, and the glass is slightly cloudy.

G: The glass is cloudy.

<Production of Magnetic Recording Medium Substrate>
(1) Production of Substrate Blank Next, a disk-shaped substrate blank was produced using method A or B below. It is also possible to obtain a glass blank for producing a glass spacer for a magnetic recording and reproducing apparatus, using the same method.

Method A

With regard to glass having the compositions shown in tables below, a clarified and homogenized molten glass was flowed out at a constant flow rate from an outflow pipe and was received with a lower die for press molding, and the molten glass having been flowed out was cut with a cutting blade so that a predetermined amount of molten glass lump was able to be obtained on the lower die. Then, the lower die holding the molten glass lump was immediately taken out from the lower position of the pipe and was press-molded into a thin-walled disk shape having a diameter of 99 mm and a thickness of 0.7 mm, through the use of an upper die facing the lower die and a drum die. The press-molded product was cooled to temperatures not causing the product to change shape, and then it was taken out from the die and annealed to give a substrate blank. Note that, in the above-described molding, a plurality of lower dies were used for molding the molten glass having been flowed out into disk-shaped substrate blanks one after another.

Method B

With regard to glass having compositions shown in the following tables, a clarified and homogenized molten glass was continuously cast from above into a heat resistant mold provided with a tubular through hole via the through hole, and the molten glass was then molded into a round column and was taken out from the lower side of the through hole. The taken-out glass was annealed and was then sliced at fixed intervals in the direction perpendicular to the round columnar axis through the use of a multi wire saw to thereby produce disk-shaped substrate blanks.

Note that, although the above-described methods A and B were employed in this example, methods C and D below are also suitable as a method for manufacturing a disk-shaped substrate blank. Also, methods C and D below are also suitable as a method for manufacturing a glass blank for producing a glass spacer for a magnetic recording and reproducing apparatus.

Method C

It is also possible to obtain a substrate blank by: allowing the molten glass to flow out onto a float bath; molding the same into a sheet-shaped glass (molding by a float method); subsequently annealing the same; and then boring a disk-shaped glass from the sheet glass.

Method D

It is also possible to obtain a substrate blank by: molding the molten glass into a sheet-shaped glass, using an overflow down-draw method (fusion method); annealing the same; and then boring a disk-shaped glass from the sheet glass.

(2) Production of Glass Substrate

A through hole was bored in the center of the substrate blank obtained using each of the above-described methods, and then grinding processing was then performed on an outer circumferential surface and an inner circumferential surface of the resulting substrate blank. Then, the main surface of the disk was subjected to lapping and polishing (mirror polishing processing) and thereby the disk was finished into a glass substrate for a magnetic disk, having a diameter of 97 mm and a thickness of 0.5 mm. It is also possible to finish a glass blank for producing a glass spacer for a magnetic recording and reproducing apparatus into a glass spacer for a magnetic recording and reproducing apparatus, using the same method.

The glass substrate obtained in the above was cleaned through the use of a 1.7 mass % aqueous solution of hydrofluorosilicic acid ($H_2SiF$), subsequently through the use of a 1 mass % aqueous solution of potassium hydroxide, and the glass substrate was then rinsed with pure water and dried. In magnification observation of the surface of the substrate produced from the glass in Example, surface roughness and the like were not recognized and the surface was smooth.

With regard to glass with each composition, four glass substrates were produced and used for the following evaluation (1), (2), or (3), or for producing the later-described magnetic recording media.

<Evaluation of Magnetic Recording Medium Substrate>
(1) Etching Rate (Chemical Resistance)

A portion of a main surface of each magnetic-disk glass substrate produced above was subjected to masking in order to produce a portion that is not to be etched, and the resulting glass substrate was immersed for a predetermined period of time in a 0.5-mass % aqueous solution of potassium hydroxide whose temperature was kept at 50° C. Thereafter, the glass substrate was removed from the aqueous solution, the mask was removed, and the depth of a level difference between a portion that did not come into contact with the aqueous solution because masking was performed thereon and a portion that came into contact with the aqueous solution because masking was not performed thereon was measured. The depth of this level difference corresponds to the etching amount (etching depth) of glass in a predetermined period of time. The etching amount per unit time, that is, the etching rate (chemical resistance), was calculated by dividing this etching amount by the immersion time.

The etching rate (chemical resistance) obtained regarding each magnetic-disk glass substrate of the examples was 0.5 nm/min or less.

(2) Amount of Deformation of Substrate Upon Impact of 70 G

With regard to each magnetic-disk glass substrate produced above, the amount of deformation of the substrate upon an impact of 70 G (G indicates gravitational acceleration) was obtained using the following evaluation methods as evaluation of impact resistance. In an HDD, the distance between a magnetic disk and a ramp is usually about 0.25 mm. Therefore, when a large impact, for example, an impact that is 70 times the gravitational acceleration (70 G), is applied, the amount of deformation of the outer circumferential edge portion of a magnetic-disk glass substrate is preferably 0.25 mm or less, and more preferably less than 0.25 mm as impact resistance. That is, the amount of deformation of a substrate upon an impact of 70 G obtained using the following method is preferably 0.25 mm or less, and more preferably less than 0.25 mm. The amount of deformation of a substrate upon an impact of 70 G may be 0.20 mm or more, for example, and is preferably lower than this value.

(Evaluation Method)

A fixed shaft fastened to a test stand of an impact tester is inserted into an inner-diameter hole in a magnetic-disk glass substrate, and the glass substrate is covered with a cap, and screwed together with the cap so as to fix the glass substrate thereto.

The height of the test stand of the impact tester (the fall distance of the test stand) and a cushioning member mounted on a pedestal when the test stand has fallen are adjusted so as to achieve a predetermined impact force. Adjustment performed using the cushioning member is fine adjustment. The impact force and the impact duration are measured using an acceleration sensor attached to the test stand by amplifying the output signals of the acceleration sensor using an amplifier, and processing the output signals of the amplifier using a personal computer so as to obtain the respective values. In order to obtain a predetermined impact force, the height of the test stand and the conditions of the cushioning member are determined while obtaining the impact force and the impact duration when the test stand is dropped several times from different heights of the test stand and under different conditions of the cushioning member.

When the height of the test stand and the conditions of the cushioning member are determined, then, the amount of vibration (displacement amount) of the outer circumferential edge portion of the magnetic-disk glass substrate occurring upon the next impact is checked using a high-speed camera. Specifically, a high-brightness lighting apparatus is used to perform imaging at high resolution, and images of instantaneous movement of the outer circumferential edge portion of the magnetic-disk glass substrate are captured when an impact force is applied, based on the captured image (one frame: 1/10,000 seconds, and imaging time: 30 milliseconds). Based on the results of imaging, the movement of the outer circumferential edge portion of the magnetic-disk glass substrate is observed and quantified, and the maximum vibration (displacement amount) is obtained. A graph where a period of time elapsed after an impact force was applied is shown on the horizontal axis and the displacement amount of the outer circumferential edge portion of the magnetic-disk glass substrate is shown on the vertical axis is created. Negative values indicate downward displacement and positive values indicate upward displacement on the vertical axis. Due to the impact at the time of the fall, the outer circumferential edge portion of the magnetic-disk glass substrate is displaced downward by a displacement amount Y0 (negative value) immediately after the fall, and is displaced upward by a displacement amount Y1 (positive value) immediately after the fall due to a rebound, and vibration is dampened while these instances of displacement are repeated. Thus, the maximum value of the downward displacement amounts is the displacement amount Y0 obtained immediately after the fall, and the maximum value of the upward displacement amounts is the upward displacement amount Y1 immediately after the displacement by the downward displacement amount Y0. A displacement amount when a given impact force is applied is obtained as "Y1−Y0". The displacement amount "Y1−Y0" at an impact of 70 G is a relatively small value, and thus it is difficult to obtain a displacement amount with high accuracy. In view of this, because there is a proportional relationship between the magnitude of impact force and the displacement amount "Y1−Y0", the displacement amount "Y1−Y0" at each impact force is obtained by changing the magnitude of the impact force in a range of more than 70 G, and the obtained values are plotted on a graph where the displacement amount "Y1−Y0" is shown on the vertical axis and the magnitude of the impact force is shown on the horizontal axis. An approximate straight line is created using the method of least squares, and the displacement amount "Y1−Y0" at an impact of 70 G is obtained using the linear equation of this approximate straight line.

The displacement amounts "Y1−Y0" shown in Table 2 are the amounts of deformation of substrates at an impact of 70 G that are obtained from the values of the displacement amounts "Y1−Y0" at four different impact forces, namely 120 G, 140 G, 170 G, and 190 G.

Comparative Example 1

With regard to glass having the composition of Example 3 shown in Table 3 of PTL 1 (JP 2002-348141A), magnetic-disk glass substrates were produced using the same method as that of the above-described examples. With regard to the produced magnetic-disk glass substrates, the amounts of deformation of the substrates at an impact of 70 G were obtained using the same method as the above.

The above results are shown in Table 2 (Tables 2-1 to 2-7).

TABLE 1-1

| | | $B_2O_3$ | $SiO_2$ | $Al_2O_3$ | MgO | CaO | SrO | $ZrO_2$ | $Li_2O$ | $Na_2O$ | $K_2O$ | $TiO_2$ | $Y_2O_3$ | $SnO_2$ | $CeO_2$ | Total | $Fe_2O_3$ |
|---|---|---|---|---|---|---|---|---|---|---|---|---|---|---|---|---|---|
| 1 | mol % | 0.0 | 57.0 | 13.0 | 23.0 | 2.0 | 0.0 | 0.0 | 3.0 | 0.0 | 0.0 | 2.0 | 0.0 | 0.0 | 0.0 | 100.0 | 0.0 |
| 2 | mol % | 0.0 | 57.0 | 16.0 | 20.0 | 2.0 | 0.0 | 0.0 | 3.0 | 0.0 | 0.0 | 2.0 | 0.0 | 0.0 | 0.0 | 100.0 | 0.0 |
| 3 | mol % | 0.0 | 57.0 | 19.0 | 17.0 | 2.0 | 0.0 | 0.0 | 3.0 | 0.0 | 0.0 | 2.0 | 0.0 | 0.0 | 0.0 | 100.0 | 0.0 |
| 4 | mol % | 0.0 | 57.5 | 11.0 | 23.5 | 3.0 | 0.0 | 0.0 | 3.0 | 0.0 | 0.0 | 2.0 | 0.0 | 0.0 | 0.0 | 100.0 | 0.0 |
| 5 | mol % | 0.0 | 57.5 | 12.0 | 23.5 | 3.0 | 0.0 | 0.0 | 2.0 | 0.0 | 0.0 | 2.0 | 0.0 | 0.0 | 0.0 | 100.0 | 0.0 |

TABLE 1-1-continued

| | | $B_2O_3$ | $SiO_2$ | $Al_2O_3$ | MgO | CaO | SrO | $ZrO_2$ | $Li_2O$ | $Na_2O$ | $K_2O$ | $TiO_2$ | $Y_2O_3$ | $SnO_2$ | $CeO_2$ | Total | $Fe_2O_3$ |
|---|---|---|---|---|---|---|---|---|---|---|---|---|---|---|---|---|---|
| 6 | mol % | 0.0 | 57.5 | 13.0 | 23.5 | 3.0 | 0.0 | 1.0 | 1.0 | 0.0 | 0.0 | 1.0 | 0.0 | 0.0 | 0.0 | 100.0 | 0.0 |
| 7 | mol % | 2.5 | 57.5 | 13.0 | 24.5 | 0.0 | 0.0 | 0.5 | 2.0 | 0.0 | 0.0 | 0.0 | 0.0 | 0.0 | 0.0 | 100.0 | 0.0 |
| 8 | mol % | 0.0 | 57.5 | 13.5 | 23.0 | 0.0 | 0.0 | 0.0 | 4.0 | 0.0 | 0.0 | 2.0 | 0.0 | 0.0 | 0.0 | 100.0 | 0.0 |
| 9 | mol % | 0.0 | 57.5 | 16.5 | 16.0 | 4.0 | 0.0 | 0.0 | 5.0 | 0.0 | 0.0 | 1.0 | 0.0 | 0.0 | 0.0 | 100.0 | 0.0 |
| 10 | mol % | 1.0 | 58.0 | 10.0 | 22.0 | 3.0 | 0.0 | 0.0 | 3.0 | 0.0 | 0.0 | 3.0 | 0.0 | 0.0 | 0.0 | 100.0 | 0.0 |
| 11 | mol % | 2.0 | 58.0 | 10.0 | 24.5 | 1.5 | 0.0 | 0.0 | 2.0 | 2.0 | 0.0 | 0.0 | 0.0 | 0.0 | 0.0 | 100.0 | 0.0 |
| 12 | mol % | 0.0 | 58.0 | 11.0 | 22.0 | 4.0 | 0.0 | 0.0 | 3.0 | 0.0 | 0.0 | 2.0 | 0.0 | 0.0 | 0.0 | 100.0 | 0.0 |
| 13 | mol % | 0.0 | 58.0 | 12.0 | 22.0 | 3.0 | 0.0 | 0.0 | 3.0 | 0.0 | 0.0 | 2.0 | 0.0 | 0.0 | 0.0 | 100.0 | 0.0 |
| 14 | mol % | 1.0 | 58.0 | 13.0 | 22.0 | 4.0 | 0.0 | 0.0 | 2.0 | 0.0 | 0.0 | 0.0 | 0.0 | 0.0 | 0.0 | 100.0 | 0.0 |
| 15 | mol % | 1.0 | 58.0 | 13.0 | 20.0 | 3.0 | 0.0 | 0.0 | 3.0 | 0.0 | 0.0 | 2.0 | 0.0 | 0.0 | 0.0 | 100.0 | 0.0 |
| 16 | mol % | 1.0 | 58.0 | 13.0 | 21.0 | 3.0 | 0.0 | 0.0 | 2.0 | 2.0 | 0.0 | 0.0 | 0.0 | 0.0 | 0.0 | 100.0 | 0.0 |
| 17 | mol % | 0.0 | 58.0 | 13.0 | 22.0 | 3.0 | 0.0 | 0.0 | 3.0 | 0.0 | 0.0 | 1.0 | 0.0 | 0.0 | 0.0 | 100.0 | 0.0 |
| 18 | mol % | 0.0 | 58.0 | 13.0 | 22.0 | 2.0 | 0.0 | 0.0 | 3.0 | 0.0 | 0.0 | 2.0 | 0.0 | 0.0 | 0.0 | 100.0 | 0.0 |
| 19 | mol % | 2.0 | 58.0 | 13.0 | 21.0 | 1.0 | 0.0 | 1.0 | 3.0 | 0.0 | 0.0 | 1.0 | 0.0 | 0.0 | 0.0 | 100.0 | 0.0 |
| 20 | mol % | 0.0 | 58.0 | 13.0 | 23.0 | 1.0 | 0.0 | 0.0 | 3.0 | 0.0 | 0.0 | 2.0 | 0.0 | 0.0 | 0.0 | 100.0 | 0.0 |

TABLE 1-2

| | | $B_2O_3$ | $SiO_2$ | $Al_2O_3$ | MgO | CaO | SrO | $ZrO_2$ | $Li_2O$ | $Na_2O$ | $K_2O$ | $TiO_2$ | $Y_2O_3$ | $SnO_2$ | $CeO_2$ | Total | $Fe_2O_3$ |
|---|---|---|---|---|---|---|---|---|---|---|---|---|---|---|---|---|---|
| 21 | mol % | 0.0 | 58.0 | 14.0 | 23.0 | 2.0 | 0.0 | 0.0 | 3.0 | 0.0 | 0.0 | 0.0 | 0.0 | 0.0 | 0.0 | 100.0 | 0.00 |
| 22 | mol % | 0.0 | 58.0 | 14.0 | 23.0 | 0.0 | 0.0 | 0.0 | 3.0 | 0.0 | 0.0 | 2.0 | 0.0 | 0.0 | 0.0 | 100.0 | 0.00 |
| 23 | mol % | 0.0 | 58.0 | 14.5 | 19.5 | 2.0 | 0.0 | 2.0 | 4.0 | 0.0 | 0.0 | 0.0 | 0.0 | 0.0 | 0.0 | 100.0 | 0.00 |
| 24 | mol % | 0.0 | 58.0 | 15.0 | 15.5 | 7.5 | 0.0 | 0.0 | 3.0 | 0.0 | 0.0 | 1.0 | 0.0 | 0.0 | 0.0 | 100.0 | 0.00 |
| 25 | mol % | 0.0 | 58.0 | 15.5 | 19.5 | 2.0 | 0.0 | 1.0 | 4.0 | 0.0 | 0.0 | 0.0 | 0.0 | 0.0 | 0.0 | 100.0 | 0.00 |
| 26 | mol % | 0.0 | 58.0 | 16.0 | 18.0 | 2.0 | 0.0 | 0.0 | 4.5 | 0.0 | 0.0 | 1.5 | 0.0 | 0.0 | 0.0 | 100.0 | 0.00 |
| 27 | mol % | 0.0 | 58.0 | 17.0 | 16.0 | 5.0 | 0.0 | 0.0 | 3.0 | 0.0 | 0.0 | 1.0 | 0.0 | 0.0 | 0.0 | 100.0 | 0.00 |
| 28 | mol % | 0.0 | 58.0 | 17.0 | 18.0 | 2.5 | 0.0 | 0.0 | 3.8 | 0.0 | 0.0 | 0.8 | 0.0 | 0.0 | 0.0 | 100.0 | 0.00 |
| 29 | mol % | 0.0 | 58.8 | 14.3 | 20.0 | 1.9 | 0.0 | 0.0 | 5.0 | 0.0 | 0.0 | 0.0 | 0.0 | 0.0 | 0.0 | 100.0 | 0.00 |
| 30 | mol % | 0.0 | 58.8 | 16.3 | 18.0 | 1.9 | 0.0 | 0.0 | 5.0 | 0.0 | 0.0 | 0.0 | 0.0 | 0.0 | 0.0 | 100.0 | 0.00 |
| 31 | mol % | 0.0 | 58.8 | 18.2 | 18.0 | 0.0 | 0.0 | 0.0 | 5.0 | 0.0 | 0.0 | 0.0 | 0.0 | 0.0 | 0.0 | 100.0 | 0.00 |
| 32 | mol % | 2.0 | 59.0 | 11.0 | 24.0 | 0.0 | 0.0 | 0.0 | 2.0 | 1.0 | 0.0 | 0.0 | 1.0 | 0.0 | 0.0 | 100.0 | 0.00 |
| 33 | mol % | 0.0 | 59.0 | 12.0 | 21.0 | 2.0 | 0.0 | 1.0 | 3.0 | 1.0 | 0.0 | 1.0 | 0.0 | 0.0 | 0.0 | 100.0 | 0.00 |
| 34 | mol % | 0.0 | 59.0 | 12.0 | 21.0 | 0.0 | 0.0 | 1.0 | 3.0 | 1.0 | 0.0 | 3.0 | 0.0 | 0.0 | 0.0 | 100.0 | 0.00 |
| 35 | mol % | 1.0 | 59.0 | 13.0 | 21.0 | 4.0 | 0.0 | 0.0 | 1.0 | 1.0 | 0.0 | 0.0 | 0.0 | 0.0 | 0.0 | 100.0 | 0.00 |
| 36 | mol % | 1.0 | 59.0 | 13.0 | 22.0 | 4.0 | 0.0 | 0.0 | 1.0 | 0.0 | 0.0 | 0.0 | 0.0 | 0.0 | 0.0 | 100.0 | 0.00 |
| 37 | mol % | 2.0 | 59.0 | 13.0 | 21.0 | 3.0 | 0.0 | 0.0 | 2.0 | 0.0 | 0.0 | 0.0 | 0.0 | 0.0 | 0.0 | 100.0 | 0.00 |
| 38 | mol % | 1.0 | 59.0 | 13.0 | 21.0 | 2.0 | 0.0 | 0.0 | 2.0 | 0.0 | 0.0 | 2.0 | 0.0 | 0.0 | 0.0 | 100.0 | 0.00 |
| 39 | mol % | 1.0 | 59.0 | 13.0 | 22.0 | 2.0 | 0.0 | 0.0 | 2.0 | 0.0 | 0.0 | 1.0 | 0.0 | 0.0 | 0.0 | 100.0 | 0.00 |
| 40 | mol % | 2.0 | 59.0 | 13.0 | 21.0 | 1.5 | 0.0 | 1.5 | 2.0 | 0.0 | 0.0 | 0.0 | 0.0 | 0.0 | 0.0 | 100.0 | 0.00 |

TABLE 1-3

| | | $B_2O_3$ | $SiO_2$ | $Al_2O_3$ | MgO | CaO | SrO | $ZrO_2$ | $Li_2O$ | $Na_2O$ | $K_2O$ | $TiO_2$ | $Y_2O_3$ | $SnO_2$ | $CeO_2$ | Total | $Fe_2O_3$ |
|---|---|---|---|---|---|---|---|---|---|---|---|---|---|---|---|---|---|
| 41 | mol % | 1.0 | 59.0 | 13.0 | 23.5 | 1.5 | 0.0 | 0.0 | 2.0 | 0.0 | 0.0 | 0.0 | 0.0 | 0.0 | 0.0 | 100.0 | 0.00 |
| 42 | mol % | 1.0 | 59.0 | 13.0 | 20.0 | 1.0 | 0.0 | 1.0 | 2.0 | 0.0 | 0.0 | 2.0 | 0.0 | 0.0 | 0.0 | 100.0 | 0.00 |
| 43 | mol % | 0.0 | 59.0 | 13.0 | 20.0 | 1.0 | 0.0 | 0.0 | 5.0 | 0.0 | 0.0 | 2.0 | 0.0 | 0.0 | 0.0 | 100.0 | 0.00 |
| 44 | mol % | 0.0 | 59.0 | 13.0 | 21.0 | 1.0 | 0.0 | 0.0 | 2.0 | 1.0 | 0.0 | 3.0 | 0.0 | 0.0 | 0.0 | 100.0 | 0.00 |
| 45 | mol % | 1.0 | 59.0 | 13.0 | 22.0 | 1.0 | 0.0 | 0.0 | 3.0 | 1.0 | 0.0 | 0.0 | 0.0 | 0.0 | 0.0 | 100.0 | 0.00 |
| 46 | mol % | 0.0 | 59.0 | 13.0 | 22.0 | 1.0 | 0.0 | 0.0 | 3.0 | 0.0 | 0.0 | 2.0 | 0.0 | 0.0 | 0.0 | 100.0 | 0.00 |
| 47 | mol % | 1.0 | 59.0 | 13.0 | 21.0 | 0.0 | 0.0 | 1.0 | 3.0 | 0.0 | 0.0 | 2.0 | 0.0 | 0.0 | 0.0 | 100.0 | 0.00 |
| 48 | mol % | 0.0 | 59.0 | 13.5 | 19.5 | 2.0 | 0.0 | 2.0 | 4.0 | 0.0 | 0.0 | 0.0 | 0.0 | 0.0 | 0.0 | 100.0 | 0.00 |
| 49 | mol % | 0.0 | 59.0 | 13.5 | 21.5 | 2.0 | 0.0 | 1.0 | 3.0 | 0.0 | 0.0 | 0.0 | 0.0 | 0.0 | 0.0 | 100.0 | 0.00 |
| 50 | mol % | 1.0 | 59.0 | 14.0 | 21.0 | 3.0 | 0.0 | 0.0 | 2.0 | 0.0 | 0.0 | 0.0 | 0.0 | 0.0 | 0.0 | 100.0 | 0.00 |
| 51 | mol % | 0.0 | 59.0 | 14.5 | 19.5 | 4.0 | 0.0 | 1.0 | 2.0 | 0.0 | 0.0 | 0.0 | 0.0 | 0.0 | 0.0 | 100.0 | 0.00 |
| 52 | mol % | 0.0 | 59.0 | 14.5 | 19.5 | 2.0 | 0.0 | 0.0 | 3.0 | 0.0 | 0.0 | 2.0 | 0.0 | 0.0 | 0.0 | 100.0 | 0.00 |
| 53 | mol % | 0.0 | 59.0 | 14.5 | 19.5 | 2.0 | 0.0 | 0.0 | 4.0 | 0.0 | 0.0 | 1.0 | 0.0 | 0.0 | 0.0 | 100.0 | 0.00 |
| 54 | mol % | 0.0 | 59.0 | 14.5 | 19.5 | 2.0 | 0.0 | 1.0 | 4.0 | 0.0 | 0.0 | 0.0 | 0.0 | 0.0 | 0.0 | 100.0 | 0.00 |
| 55 | mol % | 0.0 | 59.0 | 14.5 | 19.5 | 2.0 | 0.0 | 1.0 | 4.0 | 0.0 | 0.0 | 0.0 | 0.0 | 0.0 | 0.0 | 100.0 | 0.00 |
| 56 | mol % | 0.0 | 59.0 | 14.5 | 19.5 | 2.0 | 0.0 | 0.0 | 4.0 | 0.0 | 0.0 | 0.0 | 1.0 | 0.0 | 0.0 | 100.0 | 0.00 |
| 57 | mol % | 0.0 | 59.0 | 14.5 | 21.5 | 2.0 | 0.0 | 1.0 | 2.0 | 0.0 | 0.0 | 0.0 | 0.0 | 0.0 | 0.0 | 100.0 | 0.00 |
| 58 | mol % | 0.0 | 59.0 | 14.5 | 19.5 | 1.5 | 0.0 | 2.0 | 3.5 | 0.0 | 0.0 | 0.0 | 0.0 | 0.0 | 0.0 | 100.0 | 0.00 |
| 59 | mol % | 0.0 | 59.0 | 14.5 | 24.5 | 0.0 | 0.0 | 0.0 | 2.0 | 0.0 | 0.0 | 0.0 | 0.0 | 0.0 | 0.0 | 100.0 | 0.00 |
| 60 | mol % | 0.0 | 59.0 | 15.0 | 16.0 | 6.0 | 0.0 | 0.0 | 3.0 | 0.0 | 0.0 | 1.0 | 0.0 | 0.0 | 0.0 | 100.0 | 0.00 |

TABLE 1-4

|  |  | B$_2$O$_3$ | SiO$_2$ | Al$_2$O$_3$ | MgO | CaO | SrO | ZrO$_2$ | Li$_2$O | Na$_2$O | K$_2$O | TiO$_2$ | Y$_2$O$_3$ | SnO$_2$ | CeO$_2$ | Total | Fe$_2$O$_3$ |
| --- | --- | --- | --- | --- | --- | --- | --- | --- | --- | --- | --- | --- | --- | --- | --- | --- | --- |
| 61 | mol % | 0.0 | 59.0 | 15.0 | 16.0 | 4.0 | 0.0 | 0.0 | 5.0 | 0.0 | 0.0 | 1.0 | 0.0 | 0.0 | 0.0 | 100.0 | 0.00 |
| 62 | mol % | 2.0 | 59.5 | 12.5 | 22.0 | 1.5 | 0.0 | 0.0 | 2.0 | 0.0 | 0.0 | 0.0 | 0.5 | 0.0 | 0.0 | 100.0 | 0.00 |
| 63 | mol % | 2.5 | 59.5 | 13.0 | 21.0 | 0.0 | 0.0 | 0.0 | 2.0 | 2.0 | 0.0 | 0.0 | 0.0 | 0.0 | 0.0 | 100.0 | 0.00 |
| 64 | mol % | 0.0 | 59.5 | 15.0 | 15.5 | 3.5 | 0.0 | 0.0 | 5.5 | 0.0 | 0.0 | 1.0 | 0.0 | 0.0 | 0.0 | 100.0 | 0.00 |
| 65 | mol % | 0.0 | 59.5 | 15.0 | 17.0 | 2.0 | 0.0 | 0.0 | 5.5 | 0.0 | 0.0 | 1.0 | 0.0 | 0.0 | 0.0 | 100.0 | 0.00 |
| 66 | mol % | 0.0 | 59.5 | 15.0 | 15.5 | 1.5 | 0.0 | 0.0 | 5.5 | 0.0 | 0.0 | 3.0 | 0.0 | 0.0 | 0.0 | 100.0 | 0.00 |
| 67 | mol % | 0.0 | 59.5 | 17.5 | 15.5 | 1.5 | 0.0 | 0.0 | 5.0 | 0.0 | 0.0 | 1.0 | 0.0 | 0.0 | 0.0 | 100.0 | 0.00 |
| 68 | mol % | 0.0 | 60.0 | 12.0 | 21.0 | 1.0 | 0.0 | 1.0 | 3.0 | 1.0 | 0.0 | 1.0 | 0.0 | 0.0 | 0.0 | 100.0 | 0.00 |
| 69 | mol % | 1.0 | 60.0 | 12.0 | 23.0 | 0.0 | 0.0 | 1.0 | 2.0 | 1.0 | 0.0 | 0.0 | 0.0 | 0.0 | 0.0 | 100.0 | 0.00 |
| 70 | mol % | 0.0 | 60.0 | 12.0 | 21.0 | 0.0 | 0.0 | 0.5 | 2.0 | 1.0 | 0.0 | 3.5 | 0.0 | 0.0 | 0.0 | 100.0 | 0.00 |
| 71 | mol % | 1.0 | 59.5 | 12.8 | 20.7 | 3.0 | 0.0 | 1.0 | 2.0 | 0.0 | 0.0 | 0.0 | 0.0 | 0.0 | 0.0 | 100.0 | 0.00 |
| 72 | mol % | 0.0 | 60.0 | 13.0 | 23.0 | 2.0 | 0.0 | 0.0 | 1.0 | 1.0 | 0.0 | 0.0 | 0.0 | 0.0 | 0.0 | 100.0 | 0.00 |
| 73 | mol % | 0.0 | 60.0 | 13.0 | 23.0 | 2.0 | 0.0 | 0.0 | 2.0 | 0.0 | 0.0 | 0.0 | 0.0 | 0.0 | 0.0 | 100.0 | 0.00 |
| 74 | mol % | 0.0 | 60.0 | 13.0 | 21.0 | 1.0 | 0.0 | 0.0 | 2.0 | 1.0 | 0.0 | 2.0 | 0.0 | 0.0 | 0.0 | 100.0 | 0.00 |
| 75 | mol % | 0.0 | 60.0 | 13.0 | 21.0 | 1.0 | 0.0 | 0.0 | 3.0 | 0.0 | 0.0 | 2.0 | 0.0 | 0.0 | 0.0 | 100.0 | 0.00 |
| 76 | mol % | 1.0 | 60.0 | 13.0 | 24.0 | 0.0 | 0.0 | 0.0 | 2.0 | 0.0 | 0.0 | 0.0 | 0.0 | 0.0 | 0.0 | 100.0 | 0.00 |
| 77 | mol % | 0.0 | 60.0 | 14.5 | 20.5 | 2.0 | 0.0 | 1.0 | 2.0 | 0.0 | 0.0 | 0.0 | 0.0 | 0.0 | 0.0 | 100.0 | 0.00 |
| 78 | mol % | 0.0 | 60.0 | 15.0 | 15.5 | 4.5 | 0.0 | 0.0 | 4.0 | 0.0 | 0.0 | 1.0 | 0.0 | 0.0 | 0.0 | 100.0 | 0.00 |
| 79 | mol % | 0.0 | 60.0 | 16.3 | 17.8 | 1.9 | 0.0 | 0.0 | 4.0 | 0.0 | 0.0 | 0.0 | 0.0 | 0.0 | 0.0 | 100.0 | 0.00 |
| 80 | mol % | 0.0 | 60.0 | 16.3 | 17.7 | 1.0 | 0.0 | 0.0 | 5.0 | 0.0 | 0.0 | 0.0 | 0.0 | 0.0 | 0.0 | 100.0 | 0.00 |

TABLE 1-5

|  |  | B$_2$O$_3$ | SiO$_2$ | Al$_2$O$_3$ | MgO | CaO | SrO | ZrO$_2$ | Li$_2$O | Na$_2$O | K$_2$O | TiO$_2$ | Y$_2$O$_3$ | SnO$_2$ | CeO$_2$ | Total | Fe$_2$O$_3$ |
| --- | --- | --- | --- | --- | --- | --- | --- | --- | --- | --- | --- | --- | --- | --- | --- | --- | --- |
| 81 | mol % | 0.0 | 60.0 | 17.0 | 15.5 | 5.5 | 0.0 | 0.0 | 2.0 | 0.0 | 0.0 | 0.0 | 0.0 | 0.0 | 0.0 | 100.0 | 0.00 |
| 82 | mol % | 0.0 | 60.0 | 17.0 | 15.5 | 4.5 | 0.0 | 1.0 | 2.0 | 0.0 | 0.0 | 0.0 | 0.0 | 0.0 | 0.0 | 100.0 | 0.00 |
| 83 | mol % | 0.0 | 60.0 | 17.0 | 15.5 | 2.5 | 0.0 | 0.0 | 4.0 | 0.0 | 0.0 | 1.0 | 0.0 | 0.0 | 0.0 | 100.0 | 0.00 |
| 34 | mol % | 1.0 | 60.7 | 12.3 | 21.6 | 2.0 | 0.0 | 0.0 | 2.0 | 0.0 | 0.0 | 0.0 | 0.3 | 0.0 | 0.0 | 100.0 | 0.00 |
| 85 | mol % | 0.0 | 60.7 | 12.7 | 23.0 | 1.0 | 0.0 | 0.0 | 2.0 | 0.0 | 0.0 | 0.0 | 0.7 | 0.0 | 0.0 | 100.0 | 0.00 |
| 86 | mol % | 0.0 | 60.8 | 10.3 | 20.0 | 3.9 | 0.0 | 0.0 | 5.0 | 0.0 | 0.0 | 0.0 | 0.0 | 0.0 | 0.0 | 100.0 | 0.00 |
| 87 | mol % | 0.0 | 60.8 | 12.3 | 20.0 | 1.9 | 0.0 | 0.0 | 5.0 | 0.0 | 0.0 | 0.0 | 0.0 | 0.0 | 0.0 | 100.0 | 0.00 |
| 88 | mol % | 0.0 | 60.8 | 14.2 | 20.0 | 0.0 | 0.0 | 0.0 | 5.0 | 0.0 | 0.0 | 0.0 | 0.0 | 0.0 | 0.0 | 100.0 | 0.00 |
| 89 | mol % | 0.0 | 60.8 | 14.3 | 18.0 | 1.9 | 0.0 | 0.0 | 5.0 | 0.0 | 0.0 | 0.0 | 0.0 | 0.0 | 0.0 | 100.0 | 0.00 |
| 90 | mol % | 0.0 | 60.8 | 15.3 | 18.0 | 1.9 | 0.0 | 0.0 | 4.0 | 0.0 | 0.0 | 0.0 | 0.0 | 0.0 | 0.0 | 100.0 | 0.00 |
| 91 | mol % | 0.0 | 60.8 | 16.2 | 18.0 | 0.0 | 0.0 | 0.0 | 5.0 | 0.0 | 0.0 | 0.0 | 0.0 | 0.0 | 0.0 | 100.0 | 0.00 |
| 92 | mol % | 0.0 | 60.8 | 16.3 | 16.0 | 1.9 | 0.0 | 0.0 | 5.0 | 0.0 | 0.0 | 0.0 | 0.0 | 0.0 | 0.0 | 100.0 | 0.00 |
| 93 | mol % | 0.0 | 60.8 | 18.3 | 15.9 | 0.0 | 0.0 | 0.0 | 5.0 | 0.0 | 0.0 | 0.0 | 0.0 | 0.0 | 0.0 | 100.0 | 0.00 |
| 94 | mol % | 0.0 | 61.0 | 13.0 | 21.0 | 2.0 | 0.0 | 0.0 | 1.0 | 0.0 | 0.0 | 2.0 | 0.0 | 0.0 | 0.0 | 100.0 | 0.00 |
| 95 | mol % | 0.0 | 61.0 | 13.0 | 22.5 | 1.5 | 0.0 | 0.0 | 2.0 | 0.0 | 0.0 | 0.0 | 0.0 | 0.0 | 0.0 | 100.0 | 0.00 |
| 96 | mol % | 0.0 | 61.0 | 13.0 | 22.5 | 0.0 | 0.0 | 1.5 | 2.0 | 0.0 | 0.0 | 0.0 | 0.0 | 0.0 | 0.0 | 100.0 | 0.00 |
| 97 | mol % | 0.0 | 61.0 | 13.0 | 21.5 | 0.0 | 0.0 | 0.0 | 1.0 | 0.0 | 0.0 | 3.5 | 0.0 | 0.0 | 0.0 | 100.0 | 0.00 |
| 98 | mol % | 0.0 | 61.8 | 10.3 | 16.0 | 3.9 | 2.0 | 1.0 | 5.0 | 0.0 | 0.0 | 0.0 | 0.0 | 0.0 | 0.0 | 100.0 | 0.00 |
| 99 | mol % | 1.0 | 61.8 | 10.3 | 18.0 | 3.9 | 0.0 | 0.0 | 5.0 | 0.0 | 0.0 | 0.0 | 0.0 | 0.0 | 0.0 | 100.0 | 0.00 |
| 100 | mol % | 0.0 | 61.8 | 10.3 | 20.0 | 1.9 | 0.0 | 1.0 | 5.0 | 0.0 | 0.0 | 0.0 | 0.0 | 0.0 | 0.0 | 100.0 | 0.00 |

TABLE 1-6

|  |  | B$_2$O$_3$ | SiO$_2$ | Al$_2$O$_3$ | MgO | CaO | SrO | ZrO$_2$ | Li$_2$O | Na$_2$O | K$_2$O | TiO$_2$ | Y$_2$O$_3$ | SnO$_2$ | CeO$_2$ | Total | Fe$_2$O$_3$ |
| --- | --- | --- | --- | --- | --- | --- | --- | --- | --- | --- | --- | --- | --- | --- | --- | --- | --- |
| 101 | mol % | 0.0 | 61.8 | 11.3 | 20.0 | 1.9 | 0.0 | 0.0 | 5.0 | 0.0 | 0.0 | 0.0 | 0.0 | 0.0 | 0.0 | 100.0 | 0.00 |
| 102 | mol % | 0.0 | 61.8 | 12.2 | 21.0 | 0.0 | 0.0 | 0.0 | 5.0 | 0.0 | 0.0 | 0.0 | 0.0 | 0.0 | 0.0 | 100.0 | 0.00 |
| 103 | mol % | 0.0 | 61.8 | 12.3 | 16.0 | 3.9 | 0.0 | 0.0 | 5.0 | 0.0 | 0.0 | 1.0 | 0.0 | 0.0 | 0.0 | 100.0 | 0.00 |
| 104 | mol % | 0.0 | 61.8 | 13.3 | 16.0 | 3.9 | 0.0 | 0.0 | 4.0 | 0.0 | 0.0 | 1.0 | 0.0 | 0.0 | 0.0 | 100.0 | 0.00 |
| 105 | mol % | 0.0 | 61.8 | 13.3 | 17.0 | 1.9 | 0.0 | 0.0 | 6.0 | 0.0 | 0.0 | 0.0 | 0.0 | 0.0 | 0.0 | 100.0 | 0.00 |
| 106 | mol % | 0.0 | 61.8 | 14.2 | 19.0 | 0.0 | 0.0 | 0.0 | 5.0 | 0.0 | 0.0 | 0.0 | 0.0 | 0.0 | 0.0 | 100.0 | 0.00 |
| 107 | mol % | 0.0 | 61.8 | 14.3 | 18.0 | 1.9 | 0.0 | 0.0 | 3.0 | 0.0 | 0.0 | 0.0 | 1.0 | 0.0 | 0.0 | 100.0 | 0.00 |
| 108 | mol % | 0.0 | 59.0 | 14.5 | 19.5 | 2.0 | 0.0 | 0.0 | 4.0 | 0.0 | 0.0 | 1.0 | 0.0 | 0.0 | 0.0 | 100.0 | 0.00 |
| 109 | mol % | 0.0 | 59.0 | 14.5 | 19.3 | 2.0 | 0.0 | 0.0 | 4.0 | 0.0 | 0.0 | 1.0 | 0.0 | 0.2 | 0.0 | 100.0 | 0.00 |
| 110 | mol % | 0.0 | 59.0 | 14.5 | 19.3 | 2.0 | 0.0 | 0.0 | 4.0 | 0.0 | 0.0 | 1.0 | 0.0 | 0.0 | 0.2 | 100.0 | 0.00 |
| 111 | mol % | 0.0 | 59.0 | 14.5 | 19.2 | 2.0 | 0.0 | 0.0 | 4.0 | 0.0 | 0.0 | 1.0 | 0.0 | 0.2 | 0.1 | 100.0 | 0.00 |
| 112 | mol % | 0.0 | 59.0 | 14.3 | 19.2 | 2.0 | 0.0 | 0.0 | 4.0 | 0.0 | 0.0 | 1.0 | 0.0 | 0.3 | 0.2 | 100.0 | 0.00 |
| 113 | mol % | 0.0 | 60.4 | 14.3 | 18.0 | 1.9 | 0.0 | 0.0 | 5.0 | 0.0 | 0.0 | 0.8 | 0.0 | 0.0 | 0.0 | 100.0 | 0.00 |
| 114 | mol % | 0.0 | 60.6 | 14.3 | 18.0 | 1.9 | 0.0 | 0.0 | 5.0 | 0.0 | 0.0 | 0.0 | 0.0 | 0.0 | 0.2 | 100.0 | 0.00 |
| 115 | mol % | 0.0 | 60.7 | 14.3 | 18.0 | 1.9 | 0.0 | 0.0 | 5.0 | 0.0 | 0.0 | 0.0 | 0.0 | 0.0 | 0.1 | 100.0 | 0.00 |
| 116 | mol % | 0.0 | 60.5 | 14.3 | 18.0 | 1.9 | 0.0 | 0.0 | 5.0 | 0.0 | 0.0 | 0.0 | 0.0 | 0.2 | 0.1 | 100.0 | 0.00 |
| 117 | mol % | 0.0 | 60.0 | 14.3 | 17.8 | 1.9 | 0.0 | 0.0 | 5.0 | 0.0 | 0.0 | 0.8 | 0.0 | 0.2 | 0.0 | 100.0 | 0.00 |
| 118 | mol % | 0.0 | 60.0 | 14.3 | 17.9 | 1.9 | 0.0 | 0.0 | 5.0 | 0.0 | 0.0 | 0.8 | 0.0 | 0.0 | 0.1 | 100.0 | 0.00 |

TABLE 1-6-continued

|     |       | $B_2O_3$ | $SiO_2$ | $Al_2O_3$ | MgO | CaO | SrO | $ZrO_2$ | $Li_2O$ | $Na_2O$ | $K_2O$ | $TiO_2$ | $Y_2O_3$ | $SnO_2$ | $CeO_2$ | Total | $Fe_2O_3$ |
|-----|-------|----------|---------|-----------|-----|-----|-----|---------|---------|---------|--------|---------|----------|---------|---------|-------|-----------|
| 119 | mol % | 0.0 | 60.0 | 14.2 | 17.8 | 1.9 | 0.0 | 0.0 | 5.0 | 0.0 | 0.0 | 0.8 | 0.0 | 0.2 | 0.1 | 100.0 | 0.00 |
| 120 | mol % | 0.0 | 61.0 | 12.3 | 19.7 | 1.9 | 0.0 | 0.0 | 4.8 | 0.0 | 0.0 | 0.0 | 0.0 | 0.2 | 0.1 | 100.0 | 0.00 |

TABLE 1-7

|     |       | $B_2O_3$ | $SiO_2$ | $Al_2O_3$ | MgO | CaO | SrO | $ZrO_2$ | $Li_2O$ | $Na_2O$ | $K_2O$ | $TiO_2$ | $Y_2O_3$ | $SnO_2$ | $CeO_2$ | Total | $Fe_2O_3$ |
|-----|-------|----------|---------|-----------|-----|-----|-----|---------|---------|---------|--------|---------|----------|---------|---------|-------|-----------|
| 121 | mol % | 0.0 | 59.4 | 12.4 | 21.3 | 1.9 | 0.0 | 0.0 | 4.7 | 0.0 | 0.0 | 0.0 | 0.0 | 0.2 | 0.1 | 100.0 | 0.00 |
| 122 | mol % | 0.0 | 59.1 | 12.2 | 21.8 | 1.9 | 0.0 | 0.0 | 4.7 | 0.0 | 0.0 | 0.0 | 0.0 | 0.2 | 0.1 | 100.0 | 0.00 |
| 123 | mol % | 0.0 | 59.6 | 14.5 | 16.7 | 1.8 | 0.0 | 0.0 | 4.9 | 0.0 | 0.0 | 2.2 | 0.0 | 0.2 | 0.1 | 100.0 | 0.00 |
| 124 | mol % | 0.0 | 59.6 | 14.8 | 16.7 | 1.6 | 0.0 | 0.0 | 4.8 | 0.0 | 0.0 | 2.2 | 0.0 | 0.2 | 0.1 | 100.0 | 0.00 |
| 125 | mol % | 0.0 | 58.7 | 12.9 | 19.5 | 1.7 | 0.0 | 0.0 | 4.8 | 0.0 | 0.0 | 2.1 | 0.0 | 0.2 | 0.1 | 100.0 | 0.00 |
| 126 | mol % | 0.0 | 59.7 | 12.0 | 19.4 | 1.7 | 0.0 | 0.0 | 4.8 | 0.0 | 0.0 | 2.1 | 0.0 | 0.2 | 0.1 | 100.0 | 0.00 |
| 127 | mol % | 0.0 | 61.0 | 12.3 | 19.7 | 1.9 | 0.0 | 0.0 | 4.8 | 0.0 | 0.0 | 0.0 | 0.0 | 0.2 | 0.1 | 100.0 | 0.01 |
| 128 | mol % | 0.0 | 59.4 | 12.4 | 21.3 | 1.9 | 0.0 | 0.0 | 4.7 | 0.0 | 0.0 | 0.0 | 0.0 | 0.2 | 0.1 | 100.0 | 0.01 |
| 129 | mol % | 0.0 | 59.1 | 12.2 | 21.8 | 1.9 | 0.0 | 0.0 | 4.7 | 0.0 | 0.0 | 0.0 | 0.0 | 0.2 | 0.1 | 100.0 | 0.01 |
| 130 | mol % | 0.0 | 59.6 | 14.5 | 16.7 | 1.8 | 0.0 | 0.0 | 4.9 | 0.0 | 0.0 | 2.2 | 0.0 | 0.2 | 0.1 | 100.0 | 0.01 |
| 131 | mol % | 0.0 | 59.6 | 14.8 | 16.7 | 1.6 | 0.0 | 0.0 | 4.8 | 0.0 | 0.0 | 2.2 | 0.0 | 0.2 | 0.1 | 100.0 | 0.01 |
| 132 | mol % | 0.0 | 58.7 | 12.9 | 19.5 | 1.7 | 0.0 | 0.0 | 4.8 | 0.0 | 0.0 | 2.1 | 0.0 | 0.2 | 0.1 | 100.0 | 0.01 |
| 133 | mol % | 0.0 | 59.7 | 12.0 | 19.4 | 1.7 | 0.0 | 0.0 | 4.8 | 0.0 | 0.0 | 2.1 | 0.0 | 0.2 | 0.1 | 100.0 | 0.01 |
| 134 | mol % | 0.0 | 58.9 | 12.0 | 21.9 | 1.8 | 0.0 | 0.0 | 5.0 | 0.0 | 0.0 | 0.0 | 0.0 | 0.2 | 0.2 | 100.0 | 0.00 |
| 135 | mol % | 0.0 | 61.3 | 13.1 | 18.6 | 0.0 | 1.2 | 0.0 | 4.6 | 0.0 | 0.0 | 0.8 | 0.0 | 0.2 | 0.2 | 100.0 | 0.00 |
| 136 | mol % | 0.0 | 58.8 | 11.9 | 21.8 | 1.8 | 0.0 | 0.0 | 4.8 | 0.0 | 0.0 | 0.5 | 0.0 | 0.2 | 0.2 | 100.0 | 0.00 |
| 137 | mol % | 0.0 | 55.0 | 13.0 | 24.0 | 2.0 | 0.0 | 0.0 | 4.0 | 0.0 | 0.0 | 2.0 | 0.0 | 0.0 | 0.0 | 100.0 | 0.00 |
| 138 | mol % | 0.0 | 58.0 | 12.5 | 26.4 | 1.1 | 0.0 | 0.0 | 2.0 | 0.0 | 0.0 | 0.0 | 0.0 | 0.0 | 0.0 | 100.0 | 0.00 |
| 139 | mol % | 0.0 | 54.5 | 12.6 | 27.9 | 3.0 | 0.0 | 0.0 | 2.0 | 0.0 | 0.0 | 0.0 | 0.0 | 0.0 | 0.0 | 100.0 | 0.00 |
| Comp. Ex. 1 | mol % | 0 | 67 | 10 | 1.6 | 2.2 | 0 | 0 | 8 | 11 | 0.3 | 0 | 0 | 0 | 0 | 100.1 | 0 |

TABLE 2-1

|   | $SiO_2$ + MgO + $Li_2O$ + $Al_2O_3$ + CaO | ($SiO_2$ + MgO)/$Li_2O$ | ($Al_2O_3$ + CaO)/MgO | MgO/CaO | MgO/$Li_2O$ | CaO/$Al_2O_3$ | CaO/($Al_2O_3$ + MgO) | $Al_2O_3$ + MgO + CaO | Glass transition Temp. Tg (° C.) |
|---|---|---|---|---|---|---|---|---|---|
| 1  | 98.0 | 26.7 | 0.65 | 11.50 | 7.67  | 0.15 | 0.06 | 38.00 | 688 |
| 2  | 98.0 | 25.7 | 0.90 | 10.00 | 6.67  | 0.13 | 0.06 | 38.00 | 703 |
| 3  | 98.0 | 24.7 | 1.24 | 8.50  | 5.67  | 0.11 | 0.06 | 38.00 | 716 |
| 4  | 98.0 | 27.0 | 0.60 | 7.83  | 7.83  | 0.27 | 0.09 | 37.50 | 714 |
| 5  | 98.0 | 40.5 | 0.64 | 7.83  | 11.75 | 0.25 | 0.08 | 38.50 | 695 |
| 6  | 98.0 | 81.0 | 0.68 | 7.83  | 23.50 | 0.23 | 0.08 | 39.50 | 690 |
| 7  | 97.0 | 41.0 | 0.53 | —     | 12.25 | 0.00 | 0.00 | 37.50 | 701 |
| 8  | 98.0 | 20.1 | 0.59 | —     | 5.75  | 0.00 | 0.00 | 36.50 | 679 |
| 9  | 99.0 | 14.7 | 1.28 | —     | 3.20  | 0.24 | 0.12 | 36.50 | 662 |
| 10 | 96.0 | 26.7 | 0.59 | 7.33  | 7.33  | 0.30 | 0.09 | 35.00 | 664 |
| 11 | 96.0 | 41.3 | 0.47 | 16.33 | 12.25 | 0.15 | 0.04 | 36.00 | 679 |
| 12 | 98.0 | 26.7 | 0.68 | 5.50  | 7.33  | 0.36 | 0.12 | 37.00 | 685 |
| 13 | 98.0 | 26.7 | 0.68 | 7.33  | 7.33  | 0.25 | 0.09 | 37.00 | 689 |
| 14 | 99.0 | 40.0 | 0.77 | 5.50  | 11.00 | 0.31 | 0.11 | 39.00 | 704 |
| 15 | 97.0 | 26.0 | 0.80 | 6.67  | 6.67  | 0.23 | 0.09 | 36.00 | 680 |
| 16 | 97.0 | 39.5 | 0.76 | 7.00  | 10.50 | 0.23 | 0.09 | 37.00 | 758 |
| 17 | 99.0 | 26.7 | 0.73 | 7.33  | 7.33  | 0.23 | 0.09 | 38.00 | 685 |
| 18 | 98.0 | 26.7 | 0.68 | 11.00 | 7.33  | 0.15 | 0.06 | 37.00 | 685 |
| 19 | 96.0 | 26.3 | 0.67 | 21.00 | 7.00  | 0.08 | 0.03 | 35.00 | 682 |
| 20 | 98.0 | 27.0 | 0.61 | 23.00 | 7.67  | 0.08 | 0.03 | 37.00 | 687 |

|   | Ave. Linear Expansion Coefficient α ($*10^{-7}$ ° C.$^{-1}$) | Specific Gravity | Young's Modulus (GPa) | Specific Elastic Modulus (MNm/kg) | Holding Test 1350° C.* 16 hr | Holding Test 1300° C.* 16 hr | Holding Test 1250° C.* 16 hr | Amount of deformation of substrate upon impact of 70 G (mm) |
|---|---|---|---|---|---|---|---|---|
| 1 | 61 | 2.61 | 102.2 | 39.2 |   | A | D | 0.229 |
| 2 | 56 | 2.62 | 101.0 | 38.5 |   | A | D | 0.229 |
| 3 | 52 | 2.61 | 100.0 | 38.3 | A | G | G | 0.229 |
| 4 | 51 | 2.61 | 101.5 | 38.9 |   | A | F | 0.229 |
| 5 | 47 | 2.63 | 101.9 | 38.7 |   | A | F | 0.219 |
| 6 | 51 | 2.65 | 102.6 | 38.7 |   | A | D | 0.219 |

TABLE 2-1-continued

| | | | | | | | | | |
|---|---|---|---|---|---|---|---|---|---|
| 7 | 46 | 2.56 | 93.6 | 36.6 | A | A | | | 0.219 |
| 8 | 55 | 2.55 | 101.1 | 39.6 | | A | D | | 0.229 |
| 9 | 60 | 2.59 | 98.3 | 38.0 | | A | F | | 0.250 |
| 10 | 53 | 2.64 | 97.7 | 37.0 | | A | D | | 0.229 |
| 11 | 54 | 2.54 | 91.1 | 35.9 | A | C | | | 0.239 |
| 12 | 53 | 2.64 | 99.3 | 37.7 | | A | D | | 0.229 |
| 13 | 51 | 2.64 | 99.5 | 37.7 | | A | F | | 0.229 |
| 14 | 51 | 2.59 | 93.4 | 36.1 | | A | B | | 0.229 |
| 15 | 50 | 2.63 | 97.5 | 37.1 | | A | B | | 0.229 |
| 16 | 46 | 2.56 | 94.5 | 36.9 | A | A | D | | 0.219 |
| 17 | 51 | 2.65 | 99.0 | 37.4 | | A | F | | 0.229 |
| 18 | 52 | 2.61 | 96.9 | 37.2 | | A | D | | 0.229 |
| 19 | 47 | 2.59 | 96.5 | 37.2 | | A | C | | 0.229 |
| 20 | 52 | 2.61 | 99.8 | 38.2 | | A | E | | 0.229 |

TABLE 2-2

| | $SiO_2$ + $MgO$ + $Li_2O$ + $Al_2O_3$ + $CaO$ | $(SiO_2$ + $MgO)/$ $Li_2O$ | $(Al_2O_3$ + $CaO)/$ $MgO$ | $MgO/$ $CaO$ | $MgO/$ $Li_2O$ | $CaO/$ $Al_2O_3$ | $CaO/$ $(Al_2O_3$ + $MgO)$ | $Al_2O_3$ + $MgO$ + $CaO$ | Glass transition Temp. Tg (° C.) |
|---|---|---|---|---|---|---|---|---|---|
| 21 | 100.0 | 27.0 | 0.70 | 11.50 | 7.67 | 0.14 | 0.05 | 39.00 | 680 |
| 22 | 98.0 | 27.0 | 0.61 | — | 7.67 | 0.00 | 0.00 | 37.00 | 683 |
| 23 | 98.0 | 19.4 | 0.85 | 9.75 | 4.88 | 0.14 | 0.06 | 36.00 | 700 |
| 24 | 99.0 | 24.5 | 1.45 | 2.07 | 5.17 | 0.50 | 0.25 | 38.00 | 681 |
| 25 | 99.0 | 19.4 | 0.90 | 9.75 | 4.88 | 0.13 | 0.06 | 37.00 | 702 |
| 26 | 98.5 | 16.9 | 1.00 | 9.00 | 4.00 | 0.13 | 0.06 | 36.00 | 702 |
| 27 | 99.0 | 24.7 | 1.38 | 3.20 | 5.33 | 0.29 | 0.15 | 38.00 | 680 |
| 28 | 99.3 | 20.3 | 1.08 | 7.20 | 4.80 | 0.15 | 0.07 | 37.50 | 705 |
| 29 | 100.0 | 15.8 | 0.81 | 10.53 | 4.00 | 0.13 | 0.06 | 36.20 | 665 |
| 30 | 100.0 | 15.4 | 1.01 | 9.47 | 3.60 | 0.12 | 0.06 | 36.20 | 676 |
| 31 | 100.0 | 15.4 | 1.01 | — | 3.60 | 0.00 | 0.00 | 36.20 | 659 |
| 32 | 96.0 | 41.5 | 0.46 | — | 12.00 | 0.00 | 0.00 | 35.00 | 713 |
| 33 | 97.0 | 26.7 | 0.67 | 10.50 | 7.00 | 0.17 | 0.06 | 35.00 | 678 |
| 34 | 95.0 | 26.7 | 0.57 | — | 7.00 | 0.00 | 0.00 | 33.00 | 679 |
| 35 | 98.0 | 80.0 | 0.81 | 5.25 | 21.00 | 0.31 | 0.12 | 38.00 | 688 |
| 36 | 99.0 | 81.0 | 0.77 | 5.50 | 22.00 | 0.31 | 0.11 | 39.00 | 695 |
| 37 | 98.0 | 40.0 | 0.76 | 7.00 | 10.50 | 0.23 | 0.09 | 37.00 | 751 |
| 38 | 97.0 | 40.0 | 0.71 | 10.50 | 10.50 | 0.15 | 0.06 | 36.00 | 674 |
| 39 | 98.0 | 40.5 | 0.68 | 11.00 | 11.00 | 0.15 | 0.06 | 37.00 | 691 |
| 40 | 96.5 | 40.0 | 0.69 | 14.00 | 10.50 | 0.12 | 0.04 | 35.50 | 697 |

| | Ave. Linear Expansion Coefficient α ($*10^{-7}$ ° $C.^{-1}$) | Specific Gravity | Young's Modulus (GPa) | Specific Elastic Modulus (MNm/kg) | Holding Test 1350° C.* 16 hr | Holding Test 1300° C.* 16 hr | Holding Test 1250° C.* 16 hr | Amount of deformation of substrate upon impact of 70 G (mm) |
|---|---|---|---|---|---|---|---|---|
| 21 | 53 | 2.62 | 100.3 | 38.3 | | A | D | 0.229 |
| 22 | 52 | 2.62 | 101.3 | 38.6 | | A | D | 0.229 |
| 23 | 50 | 2.64 | 101.3 | 38.4 | A | G | | 0.229 |
| 24 | 52 | 2.63 | 95.0 | 36.2 | | | A | 0.229 |
| 25 | 50 | 2.62 | 99.8 | 38.1 | A | G | | 0.229 |
| 26 | 51 | 2.57 | 100.9 | 39.3 | A | D | | 0.239 |
| 27 | 51 | 2.63 | 97.0 | 36.8 | | A | C | 0.229 |
| 28 | 51 | 2.60 | 100.0 | 38.5 | A | G | | 0.229 |
| 29 | 58 | 2.56 | 97.1 | 37.9 | | A | C | 0.239 |
| 30 | 57 | 2.56 | 97.9 | 38.3 | A | G | | 0.250 |
| 31 | 57 | 2.55 | 98.2 | 38.6 | A | G | | 0.250 |
| 32 | 52 | 2.56 | 94.5 | 36.9 | A | A | | 0.219 |
| 33 | 49 | 2.62 | 99.0 | 37.7 | | A | C | 0.229 |
| 34 | 50 | 2.63 | 98.7 | 37.6 | | A | C | 0.229 |
| 35 | 53 | 2.58 | 93.8 | 36.4 | | A | A | 0.229 |
| 36 | 50 | 2.59 | 95.4 | 36.9 | A | A | D | 0.229 |
| 37 | 42 | 2.56 | 93.8 | 36.7 | A | A | | 0.219 |
| 38 | 51 | 2.59 | 95.6 | 36.9 | A | A | A | 0.219 |
| 39 | 53 | 2.58 | 93.6 | 36.3 | A | A | A | 0.219 |
| 40 | 57 | 2.59 | 92.2 | 35.6 | A | A | C | 0.239 |

TABLE 2-3

| | SiO₂ + MgO + Li₂O + Al₂O₃ + CaO | (SiO₂ + MgO)/ Li₂O | (Al₂O₃ + CaO)/ MgO | MgO/ CaO | MgO/ Li₂O | CaO/ Al₂O₃ | CaO/ (Al₂O₃ + MgO) | Al₂O₃ + MgO + CaO | Glass transition Temp. Tg (° C.) |
|---|---|---|---|---|---|---|---|---|---|
| 41 | 99.0 | 41.3 | 0.62 | 15.67 | 11.75 | 0.12 | 0.04 | 38.00 | 706 |
| 42 | 95.0 | 39.5 | 0.70 | 20.00 | 10.00 | 0.08 | 0.03 | 34.00 | 672 |
| 43 | 98.0 | 15.8 | 0.70 | 20.00 | 4.00 | 0.08 | 0.03 | 34.00 | 658 |
| 44 | 96.0 | 40.0 | 0.67 | 21.00 | 10.50 | 0.08 | 0.03 | 35.00 | 670 |
| 45 | 98.0 | 27.0 | 0.64 | 22.00 | 7.33 | 0.08 | 0.03 | 36.00 | 674 |
| 46 | 98.0 | 27.0 | 0.64 | 22.00 | 7.33 | 0.08 | 0.03 | 36.00 | 689 |
| 47 | 96.0 | 26.7 | 0.62 | — | 7.00 | 0.00 | 0.00 | 34.00 | 675 |
| 48 | 98.0 | 19.6 | 0.79 | 9.75 | 4.88 | 0.15 | 0.06 | 35.00 | 701 |
| 49 | 99.0 | 26.8 | 0.72 | 10.75 | 7.17 | 0.15 | 0.06 | 37.00 | 730 |
| 50 | 99.0 | 40.0 | 0.81 | 7.00 | 10.50 | 0.21 | 0.09 | 38.00 | 762 |
| 51 | 99.0 | 39.3 | 0.95 | 4.88 | 9.75 | 0.28 | 0.12 | 38.00 | 751 |
| 52 | 98.0 | 26.2 | 0.85 | 9.75 | 6.50 | 0.14 | 0.06 | 36.00 | 735 |
| 53 | 99.0 | 19.6 | 0.85 | 9.75 | 4.88 | 0.14 | 0.06 | 36.00 | 698 |
| 54 | 99.0 | 19.6 | 0.85 | 9.75 | 4.88 | 0.14 | 0.06 | 36.00 | 715 |
| 55 | 99.0 | 19.6 | 0.85 | 9.75 | 4.88 | 0.14 | 0.06 | 36.00 | 715 |
| 56 | 99.0 | 19.6 | 0.85 | 9.75 | 4.88 | 0.14 | 0.06 | 36.00 | 720 |
| 57 | 99.0 | 40.3 | 0.77 | 10.75 | 10.75 | 0.14 | 0.06 | 38.00 | 753 |
| 58 | 98.0 | 22.4 | 0.82 | 13.00 | 5.57 | 0.10 | 0.04 | 35.50 | 718 |
| 59 | 100.0 | 41.8 | 0.59 | — | 12.25 | 0.00 | 0.00 | 39.00 | 706 |
| 60 | 99.0 | 25.0 | 1.31 | 2.67 | 5.33 | 0.40 | 0.19 | 37.00 | 728 |

| | Ave. Linear Expansion Coefficient α (*10⁻⁷ ° C.⁻¹) | Specific Gravity | Young's Modulus (GPa) | Specific Elastic Modulus (MNm/kg) | Holding Test 1350° C.* 16 hr | Holding Test 1300° C.* 16 hr | Holding Test 1250° C.* 16 hr | Amount of deformation of substrate upon impact of 70 G (mm) |
|---|---|---|---|---|---|---|---|---|
| 41 | 56 | 2.56 | 91.9 | 35.9 | A | A | D | 0.239 |
| 42 | 48 | 2.61 | 98.4 | 37.8 | A | A | C | 0.219 |
| 43 | 58 | 2.61 | 98.0 | 37.6 | | A | D | 0.239 |
| 44 | 50 | 2.61 | 98.0 | 37.6 | A | A | C | 0.219 |
| 45 | 47 | 2.58 | 96.2 | 37.2 | | A | B | 0.229 |
| 46 | 52 | 2.63 | 99.1 | 37.7 | | A | E | 0.229 |
| 47 | 47 | 2.60 | 98.1 | 37.8 | | A | D | 0.229 |
| 48 | 49 | 2.63 | 100.1 | 38.1 | A | G | | 0.229 |
| 49 | 49 | 2.61 | 100.5 | 38.5 | A | A | C | 0.229 |
| 50 | 41 | 2.58 | 96.0 | 37.3 | A | D | | 0.219 |
| 51 | 42 | 2.61 | 99.8 | 38.2 | | A | D | 0.219 |
| 52 | 50 | 2.59 | 98.2 | 37.9 | | A | G | 0.229 |
| 53 | 51 | 2.58 | 97.8 | 38.0 | | A | C | 0.229 |
| 54 | 56 | 2.59 | 99.2 | 38.3 | A | A | C | 0.229 |
| 55 | 56 | 2.59 | 99.2 | 38.3 | | A | C | 0.229 |
| 56 | 52 | 2.63 | 99.4 | 37.9 | | A | D | 0.229 |
| 57 | 47 | 2.61 | 99.8 | 38.2 | A | A | C | 0.219 |
| 58 | 50 | 2.63 | 100.5 | 38.2 | A | G | | 0.229 |
| 59 | 49 | 2.56 | 93.2 | 36.4 | A | A | | 0.229 |
| 60 | 51 | 2.66 | 98.0 | 36.9 | | | A | 0.229 |

TABLE 2-4

| | SiO₂ + MgO + Li₂O + Al₂O₃ + CaO | (SiO₂ + MgO)/ Li₂O | (Al₂O₃ + CaO)/ MgO | MgO/ CaO | MgO/ Li₂O | CaO/ Al₂O₃ | CaO/ (Al₂O₃ + MgO) | Al₂O₃ + MgO + CaO | Glass transition Temp. Tg (° C.) |
|---|---|---|---|---|---|---|---|---|---|
| 61 | 99.0 | 15.0 | 1.19 | 4.00 | 3.20 | 0.27 | 0.13 | 35.00 | 661 |
| 62 | 97.5 | 40.8 | 0.64 | 14.67 | 11.00 | 0.12 | 0.04 | 36.00 | 706 |
| 63 | 95.5 | 40.3 | 0.62 | — | 10.50 | 0.00 | 0.00 | 34.00 | 684 |
| 64 | 99.0 | 13.6 | 1.19 | 4.43 | 2.82 | 0.23 | 0.11 | 34.00 | 682 |
| 65 | 99.0 | 13.9 | 1.00 | 8.50 | 3.09 | 0.13 | 0.06 | 34.00 | 683 |
| 66 | 97.0 | 13.6 | 1.06 | 10.33 | 2.82 | 0.10 | 0.05 | 32.00 | 688 |
| 67 | 99.0 | 15.0 | 1.23 | 10.33 | 3.10 | 0.09 | 0.05 | 34.50 | 665 |
| 68 | 97.0 | 27.0 | 0.62 | 21.00 | 7.00 | 0.08 | 0.03 | 34.00 | 683 |
| 69 | 97.0 | 41.5 | 0.52 | — | 11.50 | 0.00 | 0.00 | 35.00 | 707 |
| 70 | 95.0 | 40.5 | 0.57 | — | 10.50 | 0.00 | 0.00 | 33.00 | 667 |
| 71 | 98.0 | 40.1 | 0.76 | 6.90 | 10.35 | 0.23 | 0.09 | 36.50 | 754 |
| 72 | 99.0 | 83.0 | 0.65 | 11.50 | 23.00 | 0.15 | 0.06 | 38.00 | 689 |
| 73 | 100.0 | 41.5 | 0.65 | 11.50 | 11.50 | 0.15 | 0.06 | 38.00 | 702 |
| 74 | 97.0 | 40.5 | 0.67 | 21.00 | 10.50 | 0.08 | 0.03 | 35.00 | 667 |

TABLE 2-4-continued

| | | | | | | | | | |
|---|---|---|---|---|---|---|---|---|---|
| 75 | 98.0 | 27.0 | 0.67 | 21.00 | 7.00 | 0.08 | 0.03 | 35.00 | 664 |
| 76 | 99.0 | 42.0 | 0.54 | — | 12.00 | 0.00 | 0.00 | 37.00 | 698 |
| 77 | 99.0 | 40.3 | 0.80 | 10.25 | 10.25 | 0.14 | 0.06 | 37.00 | 751 |
| 78 | 99.0 | 18.9 | 1.26 | 3.44 | 3.88 | 0.30 | 0.15 | 35.00 | 705 |
| 79 | 100.0 | 19.5 | 1.02 | 9.37 | 4.45 | 0.12 | 0.06 | 36.00 | 710 |
| 80 | 100.0 | 15.5 | 0.98 | 17.70 | 3.54 | 0.06 | 0.03 | 35.00 | 678 |

| | Ave. Linear Expansion Coefficient α ($*10^{-7}$ °C.$^{-1}$) | Specific Gravity | Young's Modulus (GPa) | Specific Elastic Modulus (MNm/kg) | Holding Test 1350° C.* 16 hr | Holding Test 1300° C.* 16 hr | Holding Test 1250° C.* 16 hr | Amount of deformation of substrate upon impact of 70 G (mm) |
|---|---|---|---|---|---|---|---|---|
| 61 | 58 | 2.60 | 98.0 | 37.7 | | | A | 0.250 |
| 62 | 49 | 2.58 | 92.1 | 35.7 | | A | D | 0.239 |
| 63 | 52 | 2.51 | 92.1 | 36.7 | A | A | C | 0.219 |
| 64 | 60 | 2.55 | 96.0 | 37.6 | | | A | 0.250 |
| 65 | 61 | 2.55 | 96.4 | 37.8 | | A | G | 0.250 |
| 66 | 58 | 2.56 | 96.0 | 37.5 | | A | G | 0.250 |
| 67 | 58 | 2.54 | 96.0 | 37.9 | | A | G | 0.250 |
| 68 | 49 | 2.60 | 97.6 | 37.5 | | A | C | 0.219 |
| 69 | 48 | 2.59 | 93.9 | 36.3 | A | A | | 0.229 |
| 70 | 50 | 2.59 | 97.1 | 37.5 | A | A | D | 0.219 |
| 71 | 42 | 2.61 | 97.9 | 37.5 | A | C | | 0.219 |
| 72 | 52 | 2.57 | 94.5 | 36.7 | A | A | E | 0.219 |
| 73 | 51 | 2.56 | 92.3 | 36.0 | | A | B | 0.229 |
| 74 | 50 | 2.59 | 97.5 | 37.6 | A | A | A | 0.219 |
| 75 | 50 | 2.59 | 98.1 | 37.9 | A | A | C | 0.219 |
| 76 | 48 | 2.55 | 91.1 | 35.7 | A | A | D | 0.239 |
| 77 | 43 | 2.60 | 100.0 | 38.5 | | A | G | 0.219 |
| 78 | 50 | 2.58 | 96.5 | 37.4 | | | A | 0.239 |
| 79 | 50 | 2.55 | 96.8 | 38.0 | A | G | | 0.229 |
| 80 | 57 | 2.55 | 97.1 | 38.1 | A | G | | 0.239 |

TABLE 2-5

| | $SiO_2$ + MgO + $Li_2O$ + $Al_2O_3$ + CaO | ($SiO_2$ + MgO)/ $Li_2O$ | ($Al_2O_3$ + CaO)/ MgO | MgO/ CaO | MgO/ $Li_2O$ | CaO/ $Al_2O_3$ | CaO/ ($Al_2O_3$ + MgO) | $Al_2O_3$ + MgO + CaO | Glass transition Temp. Tg (° C.) |
|---|---|---|---|---|---|---|---|---|---|
| 81 | 100.0 | 37.8 | 1.45 | 2.82 | 7.75 | 0.32 | 0.17 | 38.00 | 714 |
| 82 | 99.0 | 37.8 | 1.39 | 3.44 | 7.75 | 0.26 | 0.14 | 37.00 | 713 |
| 83 | 99.0 | 18.9 | 1.26 | 6.20 | 3.88 | 0.15 | 0.08 | 35.00 | 712 |
| 84 | 98.7 | 41.2 | 0.66 | 10.75 | 10.80 | 0.16 | 0.06 | 35.94 | 688 |
| 85 | 99.3 | 41.8 | 0.59 | 23.23 | 11.50 | 0.08 | 0.03 | 36.66 | 716 |
| 86 | 100.0 | 16.2 | 0.71 | 5.13 | 4.00 | 0.38 | 0.13 | 34.20 | 679 |
| 87 | 100.0 | 16.2 | 0.71 | 10.53 | 4.00 | 0.15 | 0.06 | 34.20 | 680 |
| 88 | 100.0 | 16.2 | 0.71 | — | 4.00 | 0.00 | 0.00 | 34.20 | 675 |
| 89 | 100.0 | 15.8 | 0.90 | 9.47 | 3.60 | 0.13 | 0.06 | 34.20 | 695 |
| 90 | 100.0 | 19.7 | 0.96 | 9.47 | 4.50 | 0.12 | 0.06 | 35.20 | 705 |
| 91 | 100.0 | 15.8 | 0.90 | — | 3.60 | 0.00 | 0.00 | 34.20 | 682 |
| 92 | 100.0 | 15.4 | 1.14 | 8.42 | 3.20 | 0.12 | 0.06 | 34.20 | 683 |
| 93 | 100.0 | 15.3 | 1.15 | — | 3.18 | 0.00 | 0.00 | 34.20 | 684 |
| 94 | 98.0 | 82.0 | 0.71 | 10.50 | 21.00 | 0.15 | 0.06 | 36.00 | 680 |
| 95 | 100.0 | 41.8 | 0.64 | 15.00 | 11.25 | 0.12 | 0.04 | 37.00 | 686 |
| 96 | 98.5 | 41.8 | 0.58 | — | 11.25 | 0.00 | 0.00 | 35.50 | 701 |
| 97 | 96.5 | 82.5 | 0.60 | — | 21.50 | 0.00 | 0.00 | 34.50 | 683 |
| 98 | 97.0 | 15.6 | 0.89 | 4.10 | 3.20 | 0.38 | 0.15 | 30.20 | 685 |
| 99 | 99.0 | 16.0 | 0.79 | 4.62 | 3.60 | 0.38 | 0.14 | 32.20 | 686 |
| 100 | 99.0 | 16.4 | 0.61 | 10.53 | 4.00 | 0.18 | 0.06 | 32.20 | 685 |

| | Ave. Linear Expansion Coefficient α ($*10^{-7}$ °C.$^{-1}$) | Specific Gravity | Young's Modulus (GPa) | Specific Elastic Modulus (MNm/kg) | Holding Test 1350° C.* 16 hr | Holding Test 1300° C.* 16 hr | Holding Test 1250° C.* 16 hr | Amount of deformation of substrate upon impact of 70 G (mm) |
|---|---|---|---|---|---|---|---|---|
| 81 | 49 | 2.57 | 96.9 | 37.7 | A | G | | 0.219 |
| 82 | 49 | 2.58 | 97.4 | 37.8 | A | G | | 0.219 |
| 83 | 50 | 2.59 | 96.8 | 37.4 | | A | E | 0.239 |
| 84 | 49 | 2.56 | 91.4 | 35.6 | | A | D | 0.219 |
| 85 | 48 | 2.58 | 93.5 | 36.3 | | A | D | 0.229 |
| 86 | 58 | 2.54 | 93.5 | 36.9 | A | F | | 0.239 |

TABLE 2-5-continued

| | | | | | | | | | |
|---|---|---|---|---|---|---|---|---|---|
| 87 | 59 | 2.55 | 95.8 | 37.6 | | A | C | | 0.239 |
| 88 | 60 | 2.54 | 96.4 | 38.0 | A | F | | | 0.239 |
| 89 | 52 | 2.55 | 96.5 | 37.8 | | A | A | | 0.239 |
| 90 | 50 | 2.52 | 93.6 | 37.1 | | A | G | | 0.229 |
| 91 | 58 | 2.54 | 96.0 | 37.8 | A | G | | | 0.239 |
| 92 | 58 | 2.54 | 96.0 | 37.8 | A | D | | | 0.250 |
| 93 | 59 | 2.54 | 96.1 | 37.8 | A | F | | | 0.250 |
| 94 | 50 | 2.58 | 94.5 | 36.6 | A | A | A | | 0.219 |
| 95 | 52 | 2.56 | 91.3 | 35.7 | A | A | A | | 0.239 |
| 96 | 50 | 2.59 | 92.3 | 35.7 | A | G | | | 0.239 |
| 97 | 49 | 2.58 | 93.9 | 36.4 | A | A | D | | 0.229 |
| 98 | 60 | 2.61 | 93.8 | 35.9 | | A | E | | 0.239 |
| 99 | 57 | 2.53 | 94.5 | 37.4 | | A | F | | 0.239 |
| 100 | 60 | 2.58 | 95.1 | 36.9 | A | D | F | | 0.239 |

TABLE 2-6

| | $SiO_2$ + $MgO$ + $Li_2O$ + $Al_2O_3$ + $CaO$ | $(SiO_2 + MgO)/Li_2O$ | $(Al_2O_3 + CaO)/MgO$ | $MgO/CaO$ | $MgO/Li_2O$ | $CaO/Al_2O_3$ | $CaO/(Al_2O_3 + MgO)$ | $Al_2O_3 + MgO + CaO$ | Glass transition Temp. Tg (° C.) |
|---|---|---|---|---|---|---|---|---|---|
| 101 | 100.0 | 16.4 | 0.66 | 10.53 | 4.00 | 0.17 | 0.06 | 33.20 | 684 |
| 102 | 100.0 | 16.6 | 0.58 | — | 4.20 | 0.00 | 0.00 | 33.20 | 685 |
| 103 | 99.0 | 15.6 | 1.01 | 4.10 | 3.20 | 0.32 | 0.14 | 32.20 | 686 |
| 104 | 99.0 | 19.5 | 1.08 | 4.10 | 4.00 | 0.29 | 0.13 | 33.20 | 707 |
| 105 | 100.0 | 13.1 | 0.89 | 8.95 | 2.83 | 0.14 | 0.06 | 32.20 | 652 |
| 106 | 100.0 | 16.2 | 0.75 | — | 3.80 | 0.00 | 0.00 | 33.20 | 685 |
| 107 | 99.0 | 26.6 | 0.90 | 9.47 | 6.00 | 0.13 | 0.06 | 34.20 | 675 |
| 108 | 99.0 | 19.6 | 0.85 | 9.75 | 4.88 | 0.14 | 0.06 | 36.00 | 698 |
| 109 | 98.8 | 19.6 | 0.85 | 9.65 | 4.83 | 0.14 | 0.06 | 35.80 | 698 |
| 110 | 98.8 | 19.6 | 0.85 | 9.65 | 4.83 | 0.14 | 0.06 | 35.80 | 698 |
| 111 | 98.7 | 19.6 | 0.86 | 9.60 | 4.80 | 0.14 | 0.06 | 35.70 | 698 |
| 112 | 98.5 | 19.6 | 0.85 | 9.60 | 4.80 | 0.14 | 0.06 | 35.50 | 698 |
| 113 | 99.2 | 15.6 | 0.90 | 9.47 | 3.60 | 0.13 | 0.06 | 34.20 | 695 |
| 114 | 99.8 | 15.7 | 0.90 | 9.47 | 3.60 | 0.13 | 0.06 | 34.20 | 695 |
| 115 | 99.9 | 15.7 | 0.90 | 9.47 | 3.60 | 0.13 | 0.06 | 34.20 | 695 |
| 116 | 99.7 | 15.7 | 0.90 | 9.47 | 3.60 | 0.13 | 0.06 | 34.20 | 695 |
| 117 | 99.0 | 15.6 | 0.91 | 9.37 | 3.56 | 0.13 | 0.06 | 34.00 | 695 |
| 118 | 99.1 | 15.6 | 0.91 | 9.42 | 3.58 | 0.13 | 0.06 | 34.10 | 695 |
| 119 | 98.9 | 15.6 | 0.90 | 9.37 | 3.56 | 0.13 | 0.06 | 33.90 | 695 |
| 120 | 99.7 | 16.8 | 0.72 | 10.37 | 4.10 | 0.15 | 0.06 | 33.90 | 697 |

| | Ave. Linear Expansion Coefficient α (*$10^{-7}$ ° C.$^{-1}$) | Specific Gravity | Young's Modulus (GPa) | Specific Elastic Modulus (MNm/kg) | Holding Test 1350° C.* 16 hr | Holding Test 1300° C.* 16 hr | Holding Test 1250° C.* 16 hr | Amount of deformation of substrate upon impact of 70 G (mm) |
|---|---|---|---|---|---|---|---|---|
| 101 | 61 | 2.51 | 94.7 | 37.7 | | A | F | 0.239 |
| 102 | 62 | 2.52 | 94.9 | 37.7 | | A | G | 0.239 |
| 103 | 58 | 2.55 | 95.1 | 37.3 | | A | A | 0.239 |
| 104 | 49 | 2.58 | 93.5 | 36.2 | | A | E | 0.229 |
| 105 | 62 | 2.52 | 94.8 | 37.6 | | A | G | 0.250 |
| 106 | 59 | 2.50 | 92.6 | 37.0 | | A | G | 0.239 |
| 107 | 49 | 2.61 | 95.8 | 36.7 | | A | F | 0.229 |
| 108 | 51 | 2.58 | 97.8 | 38.0 | | A | C | 0.229 |
| 109 | 51 | 2.58 | 97.8 | 38.0 | | A | C | 0.229 |
| 110 | 51 | 2.58 | 97.8 | 38.0 | | A | C | 0.229 |
| 111 | 51 | 2.58 | 97.8 | 38.0 | | A | C | 0.229 |
| 112 | 51 | 2.58 | 97.8 | 38.0 | | A | C | 0.229 |
| 113 | 52 | 2.58 | 97.0 | 37.6 | | A | A | 0.239 |
| 114 | 52 | 2.55 | 96.5 | 37.8 | | A | A | 0.239 |
| 115 | 52 | 2.55 | 96.5 | 37.8 | | A | A | 0.239 |
| 116 | 52 | 2.55 | 96.5 | 37.8 | | A | A | 0.239 |
| 117 | 52 | 2.58 | 97.0 | 37.6 | | A | A | 0.239 |
| 118 | 52 | 2.58 | 97.0 | 37.6 | | A | A | 0.239 |
| 119 | 52 | 2.58 | 97.0 | 37.6 | | A | A | 0.239 |
| 120 | 47 | 2.55 | 96.3 | 37.8 | | A | A | 0.229 |

TABLE 2-7

| | SiO₂ + MgO + Li₂O + Al₂O₃ + CaO | (SiO₂ + MgO)/ Li₂O | (Al₂O₃ + CaO)/ MgO | MgO/ CaO | MgO/ Li₂O | CaO/ Al₂O₃ | CaO/ (Al₂O₃ + MgO) | Al₂O₃ + MgO + CaO | Glass transition Temp. Tg (° C.) |
|---|---|---|---|---|---|---|---|---|---|
| 121 | 99.7 | 17.2 | 0.67 | 11.21 | 4.53 | 0.15 | 0.06 | 35.60 | 693 |
| 122 | 99.7 | 17.2 | 0.65 | 11.47 | 4.64 | 0.16 | 0.06 | 35.90 | 691 |
| 123 | 97.5 | 15.6 | 0.98 | 9.28 | 3.41 | 0.12 | 0.06 | 33.00 | 699 |
| 124 | 97.5 | 15.9 | 0.98 | 10.44 | 3.48 | 0.11 | 0.05 | 33.10 | 697 |
| 125 | 97.6 | 16.3 | 0.75 | 11.47 | 4.06 | 0.13 | 0.05 | 34.10 | 687 |
| 126 | 97.6 | 16.5 | 0.71 | 11.41 | 4.04 | 0.14 | 0.05 | 33.10 | 683 |
| 127 | 99.7 | 16.8 | 0.72 | 10.37 | 4.10 | 0.15 | 0.06 | 33.90 | 697 |
| 128 | 99.7 | 17.2 | 0.67 | 11.21 | 4.53 | 0.15 | 0.06 | 35.60 | 693 |
| 129 | 99.7 | 17.2 | 0.65 | 11.47 | 4.64 | 0.16 | 0.06 | 35.90 | 691 |
| 130 | 97.5 | 15.6 | 0.98 | 9.28 | 3.41 | 0.12 | 0.06 | 33.00 | 699 |
| 131 | 97.5 | 15.9 | 0.98 | 10.44 | 3.48 | 0.11 | 0.05 | 33.10 | 697 |
| 132 | 97.6 | 16.3 | 0.75 | 11.47 | 4.06 | 0.13 | 0.05 | 34.10 | 687 |
| 133 | 97.6 | 16.5 | 0.71 | 11.41 | 4.04 | 0.14 | 0.05 | 33.10 | 683 |
| 134 | 99.6 | 16.2 | 0.63 | 12.17 | 4.38 | 0.15 | 0.05 | 35.70 | 693 |
| 135 | 97.6 | 17.4 | 0.70 | — | 4.04 | 0.00 | 0.00 | 31.70 | 704 |
| 136 | 99.1 | 16.8 | 0.63 | 12.11 | 4.54 | 0.15 | 0.05 | 35.50 | 699 |
| 137 | 98.0 | 19.8 | 0.63 | 12.00 | 6.00 | 0.15 | 0.05 | 39.00 | 695 |
| 138 | 100.0 | 42.2 | 0.52 | 24.00 | 13.20 | 0.09 | 0.03 | 40.00 | 706 |
| 139 | 100.0 | 41.2 | 0.56 | 9.30 | 13.95 | 0.24 | 0.07 | 43.50 | 695 |
| Comp. Ex. 1 | 88.8 | 8.575 | 7.63 | 0.73 | 0.20 | 0.22 | 0.19 | 13.80 | |

| | Ave. Linear Expansion Coefficient α (*$10^{-7}$ ° C.$^{-1}$) | Specific Gravity | Young's Modulus (GPa) | Specific Elastic Modulus (MNm/ kg) | Holding Test 1350° C.* 16 hr | Holding Test 1300° C.* 16 hr | Holding Test 1250° C.* 16 hr | Amount of deformation of substrate upon impact of 70 G (mm) |
|---|---|---|---|---|---|---|---|---|
| 121 | 49 | 2.57 | 97.3 | 37.9 | | A | A | 0.229 |
| 122 | 50 | 2.57 | 98.7 | 38.4 | | A | A | 0.229 |
| 123 | 46 | 2.56 | 96.1 | 37.5 | | A | A | 0.229 |
| 124 | 47 | 2.56 | 96.6 | 37.7 | | A | A | 0.229 |
| 125 | 49 | 2.58 | 97.9 | 37.9 | | A | A | 0.229 |
| 126 | 49 | 2.57 | 96.5 | 37.5 | | A | A | 0.229 |
| 127 | 47 | 2.55 | 96.3 | 37.8 | | A | A | 0.229 |
| 128 | 49 | 2.57 | 97.3 | 37.9 | | A | A | 0.229 |
| 129 | 50 | 2.57 | 98.7 | 38.4 | | A | A | 0.229 |
| 130 | 46 | 2.56 | 96.1 | 37.5 | | A | A | 0.229 |
| 131 | 47 | 2.56 | 96.6 | 37.7 | | A | A | 0.229 |
| 132 | 49 | 2.58 | 97.9 | 37.9 | | A | A | 0.229 |
| 133 | 49 | 2.57 | 96.5 | 37.5 | | A | A | 0.229 |
| 134 | 49 | 2.59 | 99 | 38.0 | | A | A | 0.229 |
| 135 | 46 | 2.58 | 95 | 36.9 | | A | A | 0.239 |
| 136 | 48 | 2.59 | 99 | 38.0 | | A | A | 0.229 |
| 137 | 61 | 2.61 | 103 | 39.5 | | A | D | 0.229 |
| 138 | 48.5 | 2.56 | 93 | 36.4 | | A | A | 0.239 |
| 139 | 53 | 2.61 | 97 | 37.1 | | A | A | 0.229 |
| Comp. Ex. 1 | | | | | | | | 0.275 |

[Production of Magnetic Recording Medium (Magnetic Disk)]

Using the following methods, an adhesive layer, an undercoat layer, a magnetic recording layer, a protective layer, and a lubricating layer were formed in that order on the main surface of the magnetic-disk glass substrate produced above to thereby obtain a magnetic disk.

First, through the use of an evacuated film formation apparatus, an adhesive layer, an undercoat layer, and a magnetic recording layer were sequentially formed using a DC magnetron sputtering method in an Ar atmosphere.

At this time, the adhesive layer was formed through the use of a CrTi target so as to give an amorphous CrTi layer having a thickness of 20 nm. Furthermore, a layer that was comprised of MgO and had a thickness of 10 nm was formed as an undercoat layer. Furthermore, a magnetic recording layer was formed at a film formation temperature of 200° C. to 400° C. through the use of an FePtC or CoPtC target so as to give an FePt granular layer or a CoPt granular layer having a thickness of 10 nm.

A magnetic disk, in which film formation up to the magnetic recording layer had been finished, was moved from the film formation apparatus into a heating furnace to thereby be subjected to annealing. The temperature in the heating furnace in annealing was set in a range of 500° C. to 700° C. Magnetic particles made of a CoPt-based alloy or an FePt-based alloy having an $L_{10}$ ordered structure were formed through this annealing process. Note that there is no limitation thereto, and heating need only be performed to realize an $L_{10}$ ordered structure.

Then, a 3 nm protective layer comprised of hydrogenated carbon was formed using a CVD method using ethylene as material gas. After that, a lubricating layer was formed using PFPE (perfluoropolyether) and using a dip coating method. The thickness of the lubricating layer was 1 nm.

A magnetic disk was obtained by the above-described manufacturing process. The obtained magnetic disk was mounted on a hard disk drive provided with a DFH mechanism and magnetic signals were recorded with a recording density of 1000 gigabits per 1 square inch in a recording region on the main surface of the magnetic disk, and were reproduced. At this time, a phenomenon (crash failure), in which a magnetic head and a magnetic disk surface collide with each other, was not confirmed.

Also, a glass spacer obtained by forming an NiP alloy-conductive film on a surface of the glass spacer obtained through the above-described manufacturing process with the use of glass of an example (a glass spacer provided with an NiP-alloy film) was mounted on a hard disk drive provided with a DFH mechanism, and magnetic signals were recorded with a recording density of 1000 gigabits per 1 square inch in a recording region on the main surface of a magnetic disk, which was separately prepared using a substrate made of a material that is different from that of glass according to an aspect of the present invention, and were reproduced. At this time, a phenomenon (crash failure), in which a magnetic head and a magnetic disk surface collide with each other, was not confirmed.

Also, the magnetic disk that was manufactured above and the glass spacer provided with the NiP-alloy film that was manufactured above, using the same glass material according an aspect of the present invention were mounted on a hard disk drive provided with a DFH mechanism, and magnetic signals were recorded with a recording density of 1000 gigabits per 1 square inch in a recording region on the main surface of the magnetic disk, and were reproduced. At this time, a phenomenon (crash failure), in which a magnetic head and a magnetic disk surface collide with each other, was not confirmed. Here, the glass substrate included in the above-described magnetic disk and the above-described glass spacer were comprised of the same glass material, and thus phenomena that may occur due to the above-described difference in the thermal expansion coefficient do not occur.

According to an aspect of the present invention, it is possible to provide a magnetic recording medium suitable for high-density recording.

Finally, the aforementioned respective aspects are summarized.

According to an aspect, provided is a glass for a magnetic recording medium substrate, which is an amorphous glass, in which an $SiO_2$ content is in a range of 54 mol % or more and 62 mol % or less, an MgO content is in a range of 15 mol % or more and 28 mol % or less, an $Li_2O$ content is in a range of 0.2 mol % or more, and an $Na_2O$ content is in a range of 5 mol % or less.

The above-described glass can have high chemical resistance and high impact resistance.

In an aspect, the mole ratio of the total content of $SiO_2$ and MgO relative to the $Li_2O$ content [$(SiO_2+MgO)/Li_2O$] in the above-described glass may be 13 or more.

In an aspect, the total content of $SiO_2$, MgO, $Li_2O$, $Al_2O_3$, and CaO ($SiO_2+MgO+Li_2O+Al_2O_3+CaO$) in the above-described glass may be 93 mol % or more.

In an aspect, the mole ratio of the total content of $Al_2O_3$ and CaO relative to the MgO content [$(Al_2O_3+CaO)/MgO$] in the above-described glass may be 0.55 or more.

In an aspect, the mole ratio of the MgO content relative to the CaO content (MgO/CaO) in the above-described glass may be 6 or more.

In an aspect, with regard to the above-described glass, the etching amount per unit time (etching rate (chemical resistance)) when glass was immersed for a predetermined period of time in a 0.5-mass % aqueous solution of hydrofluorosilicic acid whose temperature was kept at 50° C. may be 0.5 nm/min or less.

In an aspect, provided is a magnetic recording medium substrate comprised of the above-described glass for a magnetic recording medium substrate.

In an aspect, the amount of deformation of the above-described magnetic recording medium substrate at an impact of 70 G may be 0.25 mm or less.

According to an aspect, a magnetic recording medium provided with the above-described magnetic recording medium substrate and the above-described magnetic recording layer is provided.

According to an aspect, provided is a glass spacer for a magnetic recording and reproducing apparatus, the glass spacer containing an amorphous glass in which an $SiO_2$ content is in a range of 54 mol % or more and 62 mol % or less, an MgO content is in a range of 15 mol % or more and 28 mol % or less, an $Li_2O$ content is in a range of 0.2 mol % or more, and an $Na_2O$ content is in a range of 5 mol % or less.

According to an aspect, provided is a magnetic recording and reproducing apparatus that includes at least one of the above-described magnetic recording medium and the above-described glass spacer for a magnetic recording and reproducing apparatus.

It should be considered that all the embodiments disclosed this time are exemplifications in all respects and are not restrictive ones. It is intended that the scope of the present invention is shown not by the above explanations but by the claims, and that all changes in equivalent meanings and ranges to the scope of the claims are included.

By subjecting the glass composition exemplified above to the composition adjustment described in this specification, a glass for a magnetic recording medium substrate and a glass spacer for a magnetic recording and reproducing apparatus according to respective aspects of the present invention can be produced, for example.

Furthermore, it is possible, needless to say, to combine arbitrarily 2 or more items exemplified or described as preferable ranges in the specification.

What is claimed is:

1. A glass for a magnetic recording medium substrate or for a glass spacer for a magnetic recording and reproducing apparatus, which is an amorphous glass,
    wherein an $SiO_2$ content is in a range of 56 mol % or more,
    an MgO content is in a range of 15 mol % or more and 28 mol % or less,
    an $Li_2O$ content is in a range of 0.2 mol % or more,
    an $Na_2O$ content is in a range of 5 mol % or less,
    a total content of $Al_2O_3$, MgO, and CaO ($Al_2O_3+MgO+CaO$) is 29.0 mol % or more and 36.50 mol % or less,
    the total content of $SiO_2$, MgO, $Li_2O$, $Al_2O_3$, and CaO ($SiO_2+MgO+Li_2O+Al_2O_3+CaO$) is 95.0 mol % or more,
    a mole ratio of the total content of $SiO_2$ and MgO relative to the $Li_2O$ content [$(SiO_2+MgO)/Li_2O$] is 13 or more, and
    a mole ratio of a CaO content relative to a total content of $Al_2O_3$ and MgO [$CaO/(Al_2O_3+MgO)$] is 0.10 or less.

2. The glass according to claim 1,
    wherein a mole ratio of the total content of $Al_2O_3$ and CaO relative to the MgO content [$(Al_2O_3+CaO)/MgO$] is 0.55 or more.

3. The glass according to claim 1,
   wherein a mole ratio of the MgO content relative to a CaO content (MgO/CaO) is 6 or more.

4. A magnetic recording medium substrate comprised of the glass according to claim 1.

5. A magnetic recording medium comprising:
   the magnetic recording medium substrate according to claim 4; and a magnetic recording layer.

6. A glass spacer for a magnetic recording and reproducing apparatus, the glass spacer comprising the glass according to claim 1.

7. A magnetic recording and reproducing apparatus comprising the magnetic recording medium according to claim 5.

8. A magnetic recording and reproducing apparatus comprising the glass spacer according to claim 6.

* * * * *